(12) United States Patent
Youmans et al.

(10) Patent No.: US 11,290,621 B2
(45) Date of Patent: *Mar. 29, 2022

(54) SENSOR HOUSINGS, MODULES, AND LUMINAIRES INCORPORATING THE SAME COMPRISING A HEAT SINK WITH HEAT DISSIPATION STRUCTURES RADIALLY ARRANGED OVER THE OUTER WALL OF A SENSOR HOUSING

(71) Applicant: IDEAL INDUSTRIES LIGHTING LLC, Racine, WI (US)

(72) Inventors: Mark Youmans, Goleta, CA (US); Hormoz Benjamin, Tustin, CA (US); Theodore Lowes, Lompoc, CA (US)

(73) Assignee: IDEAL INDUSTRIES LIGHTING LLC, Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,770

(22) Filed: Jul. 22, 2020

(65) Prior Publication Data
US 2020/0351420 A1 Nov. 5, 2020

Related U.S. Application Data

(63) Continuation of application No. 15/784,931, filed on Oct. 16, 2017, now Pat. No. 10,848,650.

(51) Int. Cl.
| | |
|---|---|
| *F21V 29/70* | (2015.01) |
| *H04N 5/225* | (2006.01) |
| *F21V 33/00* | (2006.01) |
| *F21V 23/04* | (2006.01) |
| *F21V 29/15* | (2015.01) |
| *F21V 29/77* | (2015.01) |
| *F21V 23/00* | (2015.01) |
| *F21Y 105/10* | (2016.01) |
| *F21Y 115/10* | (2016.01) |

(52) U.S. Cl.
CPC ......... *H04N 5/2252* (2013.01); *F21V 23/008* (2013.01); *F21V 23/0442* (2013.01); *F21V 29/15* (2015.01); *F21V 29/70* (2015.01); *F21V 29/773* (2015.01); *F21V 33/00* (2013.01); *F21Y 2105/10* (2016.08); *F21Y 2115/10* (2016.08); *H04N 5/22521* (2018.08)

(58) Field of Classification Search
CPC ...... F21V 23/0442; F21V 29/15; F21V 29/70; F21V 33/00; H04N 5/22521
USPC ............................. 250/238, 239, 216, 214.1
See application file for complete search history.

(56) References Cited

U.S. PATENT DOCUMENTS

| | | | |
|---|---|---|---|
| 7,795,582 B2 * | 9/2010 | Jez ...................... | G01N 21/3581 250/336.1 |
| 9,618,394 B2 * | 4/2017 | Campbell ............... | G01J 5/025 |

* cited by examiner

*Primary Examiner* — Que Tan Le
(74) *Attorney, Agent, or Firm* — J. Clinton Wimbish; Nexsen Pruet, PLLC

(57) ABSTRACT

Sensor housings, modules, and luminaires comprising the same are provided. The sensor housings and modules set forth herein have improved heat sinking abilities for dissipating heat from a sensor while simultaneously facilitating thermal isolation of the sensor. Briefly, a sensor housing described herein comprises a cavity for housing a sensor and a heat sink. The heat sink is configured to dissipate heat from the sensor housing and thermally isolate the sensor housing from other heat generating components, such as other portions of a luminaire.

18 Claims, 35 Drawing Sheets

SENSOR HOUSINGS, MODULES, AND LUMINAIRES INCORPORATING THE SAME COMPRISING A HEAT SINK WITH HEAT DISSIPATION STRUCTURES RADIALLY ARRANGED OVER THE OUTER WALL OF A SENSOR HOUSING

RELATED APPLICATION DATA

The present application is a continuation application of U.S. patent application Ser. No. 15/784,931 filed Oct. 16, 2017.

FIELD

The present invention relates to light emitting diode (LED) luminaires and, in particular, to LED luminaires having architectures for independent thermal management of sensors disposed therein.

BACKGROUND

Sensors, including, but not limited to, image sensors, temperature sensors, fluid sensors, mass sensors, airflow sensors, directional sensors, positional sensors, vibration sensors, electrical sensors, velocity sensors, noise sensors, chemical sensors, humidity sensors, etc., impact various aspects of our daily lives. For example, such sensors are employed in a variety of different devices and systems including, but not limited to, cameras, satellites, vehicles, heating, ventilation and air conditioning (HVAC) systems, computers, handheld devices, astronomical imaging devices, surveillance devices, spectral analysis devices, telecommunication devices, aircraft, etc.

Sensors can also be employed in luminaires utilizing light emitting diodes (LEDs) and driving components. When energized, the LEDs, driving components, and sensors independently generate heat, which increases the temperature of the luminaire. The sensors, and/or components thereof, are susceptible to damage when heated to temperatures exceeding about 85° C. Moreover, thermal energy can induce noise in the sensors, which diminishes the performance thereof, in some embodiments.

SUMMARY

Sensor housings, modules, and luminaires incorporating the same are described herein. Such housings and modules can advantageously improve the thermal management within a luminaire, for example, by dissipating heat generated by a sensor and insulating the sensor from other heat-generating components of the luminaire. In one aspect, a sensor housing for incorporation with a luminaire is disclosed. The sensor housing comprises one or more walls defining a cavity for accepting a sensor, wherein a heat sink is integrated with the wall(s) of the sensor housing. The heat sink is configured to dissipate heat generated by the sensor and/or associated electronics. In some embodiments, the sensor housing and integrated heat sink are thermally isolated from the other heat generating elements in the luminaire. As described further herein, the heat sink can form one or more wall portions of the sensor housing. In other embodiments, the heat sink can be coupled to one or more wall surfaces of the sensor housing. The heat sink can employ any number and design of heat dissipating structures including, but not limited to, fins, projections, tabs, splines, tines, pins, needles, or steps or any combination thereof.

In another aspect, a sensor module is disclosed. The sensor module comprises a housing, at least one sensor component disposed in the housing, and a heat sink in thermal communication with the housing. The heat sink is configured to dissipate heat from the sensor and/or associated electronics. In some embodiments, one or more sensing elements and associated electronics are disposed in the housing. In other embodiments, electronics of the module are disposed in the housing and the sensing element is located remote from the housing. In such embodiments, the sensing element can be connected to the electronics via one or more wires or cables. In other embodiments, the sensing element is in wireless communication with the sensor module electronics. As described herein, the heat sink can form part of the sensor housing. Alternatively, the heat sink can be coupled to one or more surfaces of the sensor housing. In some embodiments, for example, the heat sink can be permanently coupled or reversibly coupled to the sensor housing. The sensor module can have design for integration with a luminaire at one or more locations in the luminaire architecture.

In some embodiments, housings and modules described herein are hybrid devices comprised of different materials. For example, some portions of the housing can be metallic and other portions of the housing can be non-metallic. In certain embodiments, the housing comprises a metallic outer wall and fins while other portions are non-metallic and formed from plastic, ceramic, etc. In certain embodiments, portions of the housings and modules are overmolded in plastic for providing an air and moisture tight enclosure for the sensor.

In some embodiments, the sensing element incorporated in such housings and modules is a camera. In other embodiments, sensing elements incorporated in such housings and modules include, without limitation, light sensors, motion sensors, various image sensors, temperature sensors, magnetic field sensors, gravity sensors, humidity sensors, moisture sensors, vibration sensors, pressure sensors, electrical field sensors, sound or noise sensors, environmental sensors, directional sensors, position sensors, velocity sensors, airflow sensors, chemical sensors (i.e., sensors that detect toxins or chemical compounds, not limited to carbon dioxide ($CO_2$) sensors, oxygen ($O_2$) sensors, etc.), electrical sensors (i.e., any sensor comprising electrical devices and/or any sensor that detects electrical events or conditions), or any combination thereof.

Such sensors can be electrically connected to a plurality of electrical components, including but not limited to a wireless interface (e.g., wireless antennae) and circuitry supported by a printed circuit board (PCB). Notably, the housings and modules described herein do not inhibit transmission of wireless signals, in some embodiments.

Further, the housings and modules described herein can be configured to maintain the sensor at temperatures between 25-85° C., 40-80° C., 40-65° C., or temperatures less than 85° C., less than 75° C., less than 65° C., or less than 55° C. Further, the housings and modules described herein can maintain the sensor at a temperature within 25° C., 20° C., 10° C., or 5° C. of ambient temperature during operation of the luminaire, where the ambient temperature is about 55° C.

In another aspect, a luminaire is disclosed. The luminaire comprises a driver assembly thermally coupled to a first heat sink, a light emitting diode (LED) assembly thermally coupled to a second heat sink, and a sensor module. The sensor module comprises a housing, at least one sensor component disposed in the housing and a heat sink in thermal communication with the housing. The module heat sink can be thermally insulated from one or each of the first and second heat sinks. In some cases, the first heat sink is also thermally insulated from the second heat sink. The first, second, and module heat sinks can optionally be disposed in a vertically stacked configuration.

These and other embodiments are described in more detail in the detailed description which follows.

DETAILED DESCRIPTION

Figure 1A:
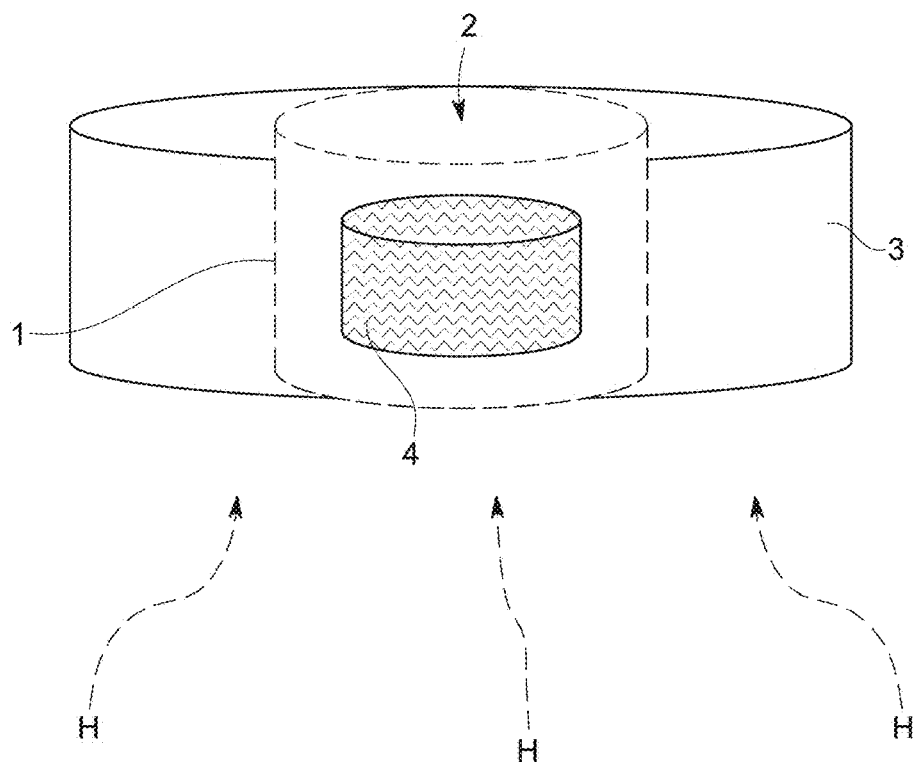
FIG. 1A is a schematic diagram of a sensor housing for integration with a luminaire according to some embodiments.

Embodiments described herein can be understood more readily by reference to the following detailed description and examples and their previous and following descriptions. The housings, modules, luminaires, and methods described herein, however, are not limited to the specific embodiments presented in the detailed description and examples. It should be recognized that these embodiments are merely illustrative of the principles of the instant invention. Numerous modifications and adaptations will be readily apparent to those of skill in the art without departing from the disclosed subject matter.

It will be understood that, although the terms first, second, etc. may be used herein to describe various features or elements, and the features or elements should not be limited by these terms. Such terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures ("FIGS."). It will be understood that these terms and those discussed above are intended to encompass different orientations of the device in addition to the orientation depicted in the FIGS.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As used herein, the term "sensor" refers to any device configured to measure and/or detect events, conditions, or changes in its environment and generate an output. For example, in some cases, such sensors utilize transducers, piezoelectric materials, thermocouples, and/or various types of electrical circuitry components (e.g., capacitors or resistors) to detect events, conditions, or changes and convert the detected information into an electrical output. Exemplary sensors configured for use and incorporation with the housings and modules described herein include, without limitation, light sensors, motion sensors, image sensors, temperature sensors, magnetic field sensors, gravity sensors, humidity sensors, moisture sensors, vibration sensors, pressure sensors, electrical field sensors, sound or noise sensors, environmental sensors, directional sensors, position sensors, velocity sensors, airflow sensors, chemical sensors (i.e., sensors that detect toxins or chemical compounds, not limited to $CO_2$ sensors, oxygen $O_2$ sensors, etc.), electrical sensors (i.e., any sensor comprising electrical devices and/or any sensor that detects electrical events or conditions), or any combination thereof.

As used herein, the term "image sensor" refers to a device that detects, converts, and/or conveys data constituting an image. The sensor can detect light passing through and/or reflected by an object, convert the variations or attenuations of light into signals, and then convey the signals to a processing entity (e.g., a processor, controller, etc.). Image sensors described herein can detect electromagnetic radiation including, but not limited to infrared light, visible light, ultraviolet light, or other types of radiation falling in the electromagnetic spectrum. Image sensors are used in electronic imaging devices such as cameras or camera modules. In some embodiments, image sensors described herein include, without limitation, cameras, semiconductor charge-coupled device (CCD) sensors, photodiode arrays, active pixel sensors having complementary metal-oxide-semiconductor (CMOS) constructions, or N-type metal-oxide-semiconductor (NMOS, Live MOS) technologies.

Sensor housings and modules described herein, in some embodiments, can facilitate thermal isolation of the sensor and sensor components from other heat generating components, such as high-temperature light emitting diodes (LEDs) and electrical components (e.g., electrical powering and driving components). Such housings and modules also advantageously dissipate heat generated by the sensors and/or sensor electronics, while still facilitating wireless communications therethrough. The housings and modules described herein are water and dust tight in compliance with IP66 ratings. An IP66 rated housing refers to an image sensor enclosure that has obtained a rating from the International Electrotechnical Commission's (IEC) international standard 60529 rating board, which declares an image sensor (or any other type of sensor) to be fully protected from dust and solid matter larger than dust as well as being safe from rain, sprinklers, and powerful water jets.

I. Sensor Housings for Incorporation in Luminaires

In one aspect, sensor housings for incorporation with luminaires are described herein. Such housings define a cavity for accepting a sensor, wherein a heat sink is integrated with the sensor housing. The heat sink is configured to dissipate heat from the sensor or sensor housing. In some embodiments, the sensor housing and heat sink are thermally isolated from other heat-generating components. For example, and in certain cases, the heat sink is configured to thermally isolate the sensor from other heat-generating components in a luminaire, such as LEDs and/or driving components.

In some cases, sensor housings further and optionally comprise a front face defining an aperture, a rear face opposite the front face and an outer wall disposed between the front face and the rear face. The outer wall can define the cavity or enclosure between the front and rear faces for housing an image sensor. As described further herein, the heat sink can be integrated with one or each of the front and rear faces as well as the outer wall. Heat sink structures, for example, can form regions of the front face, rear face and/or outer wall. For example, a plurality of heat dissipating structures can extend from the outer wall. Such dissipating structures can extend radially from the outer wall. In certain embodiments, the dissipating structures comprise projections, fins, pins, needles, steps, tines, etc. that extend radially outward from and/or substantially orthogonal relative to the outer wall of the housing. The dissipating structures can comprise linear structures, angled structures, tapered structures, and/or curved structures as defined by a direction of projection or elongation normal to the outer wall. The dissipating structures can comprise a substantially uniform thickness or a non-uniform thickness in which some portions are thicker or thinner relative to other portions of the projections.

FIGS. 1A-2D illustrate exemplary embodiments of sensor housings. FIG. 1A is a sensor housing, generally designated 1, which illustrates the general features and functionality of the housings set forth herein according to some embodiments. The housing 1 can be, but does not have to be incorporated in the modules and/or luminaires described in Sections II and III below.

Referring to FIG. 1A, the housing 1 comprises, consists, or consists essentially of a cavity 2 and a heat sink 3. The cavity is configured to house, receive, and/or retain a sensor 4. The sensor 4 can comprise any type of sensor, including but not limited to, a light sensor, a motion sensor, an image sensor, a temperature sensor, a magnetic field sensor, a gravity sensor, a humidity sensor, a moisture sensor, a vibration sensor, a pressure sensor, an electrical field sensor, a sound or noise sensor, an environmental sensor, a directional sensor, a position sensor, a velocity sensor, an airflow sensor, a chemical sensor (i.e., a sensor that detect toxins or chemical compounds, such as, for example, a $CO_2$ sensor, an oxygen $O_2$ sensor, etc.), an electrical sensor (i.e., any sensor comprising electrical devices and/or any sensor that detects electrical events or conditions), or any combination of the aforementioned sensors.

The heat sink 3 is configured to dissipate heat from the sensor 4 and/or the sensor housing 1 while simultaneously thermally isolating or shielding the sensor 4 and/or sensor housing 1 from heat H generated by remote components. In some embodiments, for example, the housing 1 and sensor 4 are disposed in a luminaire, and the heat sink 3 dissipates heat from the sensor 4 while thermally isolating the sensor 4 from other portions of the luminaire, such as isolating the sensor 4 from heat H generated by the LEDs and/or driving components.

Notably, the sensor 4 is configured to communicate data wirelessly, via a wireless interface. The wireless signals can traverse across or through the housing 1 without being substantially blocked or inhibited.

In some embodiments, the heat sink 3 forms part of the housing 1. That is, the housing 1 is the heat sink 3, and vice versa. Alternatively, the heat sink 3 is manufactured separately from the housing 1. In this case, the heat sink 3 can be permanently or reversibly coupled to the housing 1. Regardless of its construction, the heat sink 3 in in thermal communication with the housing 1 and the sensor 4.

Further, and in some cases, the heat sink 3 can comprise or be formed from a thermally conductive and heat sinking body of material. Exemplary materials for the heat sink 3 include, without limitation, metal (e.g., aluminum (Al), copper (Cu), etc.), metal alloys, thermally conductive plastics or polymers, thermally conductive composites, etc. The heat sink 3 can optionally comprise a plurality of heat dissipating structures, such as projections, fins, etc.

Figure 1B:
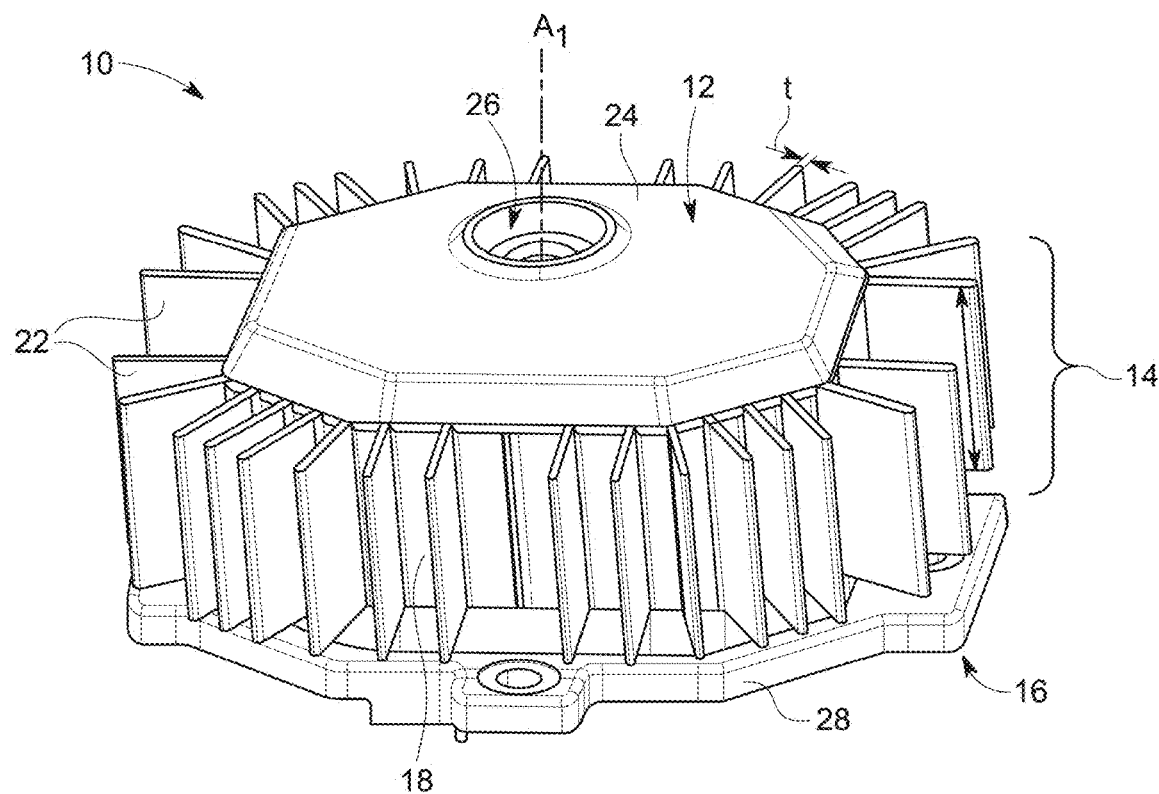
FIGS. 1B-1C are respective front and rear perspective views of a sensor housing for integration with a luminaire according to some embodiments.
Figure 1C:
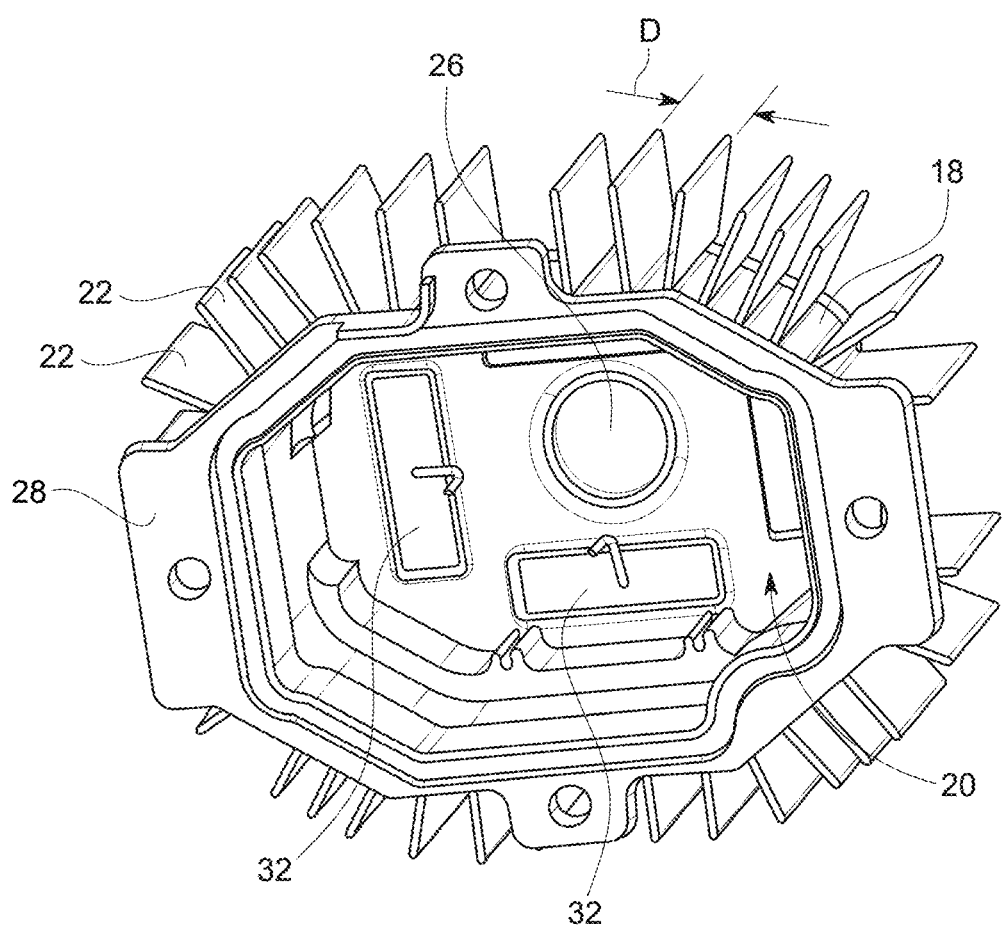

FIGS. 1B-1C illustrate more specific embodiments of a sensor housing, for example, such housings are configured to receive and retain an image sensor. Referring to FIGS. 1B-1C, a sensor housing generally designated 10 is shown. Housing 10 (also referred to as the sensor heat sink and/or a heat sinking enclosure) comprises a hybrid enclosure formed from a plurality of metallic and non-metallic materials. Housing 10 comprises, consists, and/or consists essentially of at least a first housing portion 12, a second housing portion 14, and a third housing portion 16. The first housing portion 12 comprises a front housing cover, the third housing portion 16 comprises a rear housing cover, and the second portion 14 is an intermediate portion disposed between the opposing front and rear covers. In some instances, the second housing portion 14 defines and/or forms a wall 18 around enclosure or cavity 20 (FIG. 1C) that is sealed via the first and/or third portions 12 and 16, respectively.

A plurality of heat dissipating structures 22 extend from portions of the wall 18. The first housing portion 12 is configured to face an area to be imaged and the third housing portion 16 is configured to face and/or attach to a luminaire. Notably, in some cases, the third housing portion 16 is comprised of a thermally insulating material configured to isolate and/or insulate the housing 10, and image sensor disposed therein, from the remainder of the luminaire. Alternatively, the housing may be comprised of a single (non-hybrid) enclosure that can be insulated from the remainder of the luminaire via a discrete insulating component, such as a gasket or potting material.

In some embodiments, the first housing portion 12 comprises a non-metallic material, such as a plastic, ceramic, or composite material. Alternatively, the first housing portion 12 comprises metal. The first housing portion 12 can comprise any material non inconsistent with the instant disclosure. The front housing portion 12 has a front face 24 defining an aperture 26 therein. An image sensor (62, FIG. 3A), or a portion thereof, can be partially disposed or positioned in a portion of the aperture 26 for detecting images. In certain embodiments, images are detected via detecting light passing through an object and/or reflected by an object. Images can be generated based on changes in the amount, intensity, and/or wavelength of light being received, collected, and/or otherwise detected at sensor as received through aperture 26.

As FIGS. 1B-1C further illustrate, the aperture 26 defined in the first housing portion 12 can be centrally disposed on, over, and/or in the first portion 12 of the housing 10 or, alternatively, the aperture 26 can be non-centrally disposed on, over, and/or in the first portion 12 of the housing 10, where desired. In certain embodiments, the housing 10 is rotationally symmetric about a centrally defined axis A1. In other embodiments, the housing 10 is asymmetric. In further embodiments, the housing 10 has one axis of symmetry or multiple axes of symmetry. In certain cases, A1 is an axis of symmetry.

The second portion 14 of the housing 10 can comprise metal, a metal alloy, or a metallic material. For example, the second portion 14 can comprise a thermally conductive, heat dissipating material such as aluminum (Al), copper (Cu), tin (Sn), silver (Ag), gold (Au), platinum (Pt), titanium (Ti), nickel (Ni), iron (Fe), alloys thereof, or any other metal non inconsistent with the instant disclosure. Generally, second portion 14 is a heat sink formed of a material having a thermal conductivity in the range of 3-300 W/m·K or any subrange thereof. The second portion 14 of the housing 10 can comprise any metallic or non-metallic thermally conductive material not inconsistent with the instant disclosure, such as a heat dissipating or heat sinking metal, plastic, polymeric, or composite material. The second portion 14 of the housing 10 forms a continuous outermost wall 18 disposed between the front face 24 and a rear face 28 opposite the front face. The outer wall 18 defines a cavity 20 between the front and rear faces 24 and 28, respectively, for receiving and housing an image sensor (62, FIG. 3A).

Still referring to FIGS. 1B-1C and in some embodiments, the plurality of heat dissipating structures 22 extend radially outward from the outer wall 18. The heat dissipating structures 22 can comprise projections (e.g., needle or pin projections), raised regions, fins, tabs, or any other suitable structure configured to extend from the outer wall 18. The heat dissipating structures 22 can radiate outwardly from the central axis A1 of housing 10 and are be disposed around the outer perimeter of the wall 18. The heat dissipating structures 22 can comprise linear structures, non-linear structures, angled structures, tapered structures, inclined structures, and/or curved structures extending from the outer wall. The projections 22 can comprise any size (i.e., length L, width W, and/or thickness t) as noted in Tables 1-3 below. The heat dissipating structures 22 can have uniform thickness or a non-uniform thickness (i.e., tapered thickness), in some embodiments.

TABLE 1

| Heat Dissipating Structure Length (mm) |
| --- |
| 5-150 |
| 5-100 |
| 5-50 |
| 5-10 |
| 1-50 |
| 1-25 |
| 1-10 |

TABLE 2

| Heat Dissipating Structure Width (mm) |
| --- |
| 1-150 |
| 1-100 |
| 1-50 |
| 1-25 |
| 1-10 |
| <50 |
| <10 |
| <5 |

TABLE 3

| Heat Dissipating Structure Thickness (mm) |
| --- |
| 1-50 |
| 1-30 |
| 1-10 |
| 1-5 |
| <50 |
| <10 |
| <5 |

The heat dissipating structures 22 can be spaced apart at equidistant or non-equidistant increments. That is, the distance D (FIG. 1C) between adjacent structures 22 in a given housing 10 can be uniform or varied, as desired. Several non-limiting distances D are noted in Table 4 below.

TABLE 4

| Distance between Heat Dissipating Structures (mm) |
| --- |
| 1-60 |
| 1-40 |
| 1-20 |
| 1-10 |
| <100 |
| <50 |
| <25 |
| <10 |
| <5 |

The number of heat dissipating structures 22 provided per housing 10 can also vary. For example, a housing 10 can comprise at least two heat dissipating structures, three or more heat dissipating structures, five or more heat dissipating structures, 10 or more heat dissipating structures, 15 or more heat dissipating structures, 18 or more heat dissipating structures, 24 or more heat dissipating structures, 32 or more heat dissipating structures, 40 or more heat dissipating structures, 50 or more heat dissipating structures, more than 100 heat dissipating structures, more than 200 heat dissipating structures, less than 1000 heat dissipating structures, between 5 and 500 heat dissipating structures, between 5 and 200 heat dissipating structures, between 8 and 100 heat dissipating structures, between 8 and 60 heat dissipating structures, or between 10 and 40 heat dissipating structures. Any size, shape, and/or quantity of heat dissipating structures 22 can be provided per housing 10, not inconsistent with the instant disclosure. In some cases, the heat dissipating structures 22 are extruded. Alternatively, the heat dissipating structures 22 can be machined, molded, cast, or milled.

Further, the heat dissipating structures 22 can also be arranged in any desirable shape not inconsistent with the instant disclosure. For example, in a plan view, the heat dissipating structures 22 can be arranged in a circular or substantially circular shape, in an oval or substantially oval shape, in a square or substantially square shape, in an annular shape, or any other shape not inconsistent with the instant subject matter. The heat dissipating structures 22 can extend substantially orthogonal from the wall 18 or at any acute or obtuse angle with respect to the wall 18.

Still referring to FIGS. 1B-1C in general, and in some embodiments, the third housing portion 16 can, but does not have to, comprise a thermally insulating material. For example, the third housing portion 16 can comprise a non-metallic material, plastic, ceramic, or any other insulating composite material not inconsistent with the instant disclosure. The third housing portion 16 can thermally insulate and/or isolate the housing 10 and sensor disposed therein from other portions of the luminaire. Notably, the housing 10 is configured to dissipate heat generated by an image sensor housed therein via heat dissipating structures 22 and thermally isolate the housing 10 and sensor from other portions of the luminaire via the third housing portion 16. In some embodiments, the first and third housing portions 12 and 16, respectively, are configured to seal the inner space 20 defined by the wall 18, and prevent dust and moisture from entering the same. The first and third housing portions 12 and 16, respectively, can also comprise overmolded plastic and/or be overmolded in plastic, where desired.

Referring now to FIG. 1C, a bottom view of the housing 10 is illustrated. The housing 10 defines a cavity 20 that is sealed via respective first, second, and/or third housing portions 12, 14, and/or 16 although the rear face is not shown sealed for illustration purposes only. As FIG. 1C illustrates, the heat dissipating structures 22 can be acutely or obtusely angled with respect to each other around the wall 18.

One or more communication interfaces 32 are disposed in the housing 10. In some cases, the communication interfaces 32 are wireless interfaces or wireless antennae. Such interfaces 32 can be attached or mounted to the first housing portion 12, or any other portion of the housing 10 and/or the image sensor (62, FIG. 3A) disposed therein. The communication interfaces 32 can be mounted over portions of the housing 10, the image sensor (62, FIG. 3A), or any other surface or structure disposed or supported by the housing 10 (e.g., a printed circuit board (see FIG. 2C), a substrate, a wall, a surface, etc.). Notably, the housing 10 is sealed via the front cover (i.e., 12), while still allowing wireless signals to be communicated (e.g., transmitted and/or received).

FIGS. 2A-2D illustrate aspects of a further embodiment of a sensor housing, generally designated 40. Housing 40 comprises a wall 42 that defines or forms an enclosure 44 (FIG. 2B) for receiving a sensor. Although the housing 40 is depicted as housing an image sensor, it may also house any other type of sensor described above (e.g., chemical sensors, noise sensors, etc.).

A plurality of heat dissipating structures 46 are defined in the housing 40. The heat dissipating structures 46 can be disposed over front, rear, and/or side lateral faces of the housing 40 for dissipating heat generated by the image sensor disposed therein. The housing 40 can be comprised or formed fully or partially of metal, such as Al, Sn, Cu, Ag, Fe, or alloys thereof. The housing 40 can also be comprised of plastic, ceramic, or any other material not inconsistent with the instant disclosure. In some cases, the housing 40 is extruded. Alternatively, the housing 40 can be machined, molded, cast, pressed, or milled. The housing 40 can be insulated or isolated from the remainder of the luminaire via a lower portion of the housing as described in FIGS. 1A-1C or an intermediate member that is disposed between the housing 40 and other portions of the luminaire, such as an intermediate gasket, potting material, pad, or other insulating structure.

In some cases, a lower portion 48 of the housing 40 is mounted, attached, or otherwise disposed on, over, or in a luminaire. The lower portion 48 of the housing 40 can comprise and/or be attached to a thermally insulating material for thermally insulating the housing 40 from other portions of the luminaire to maintain the image sensor disposed therein at temperatures within 25° C., 20° C., 10° C., or 5° C. of ambient temperature during operation of the luminaire.

Figure 2A:
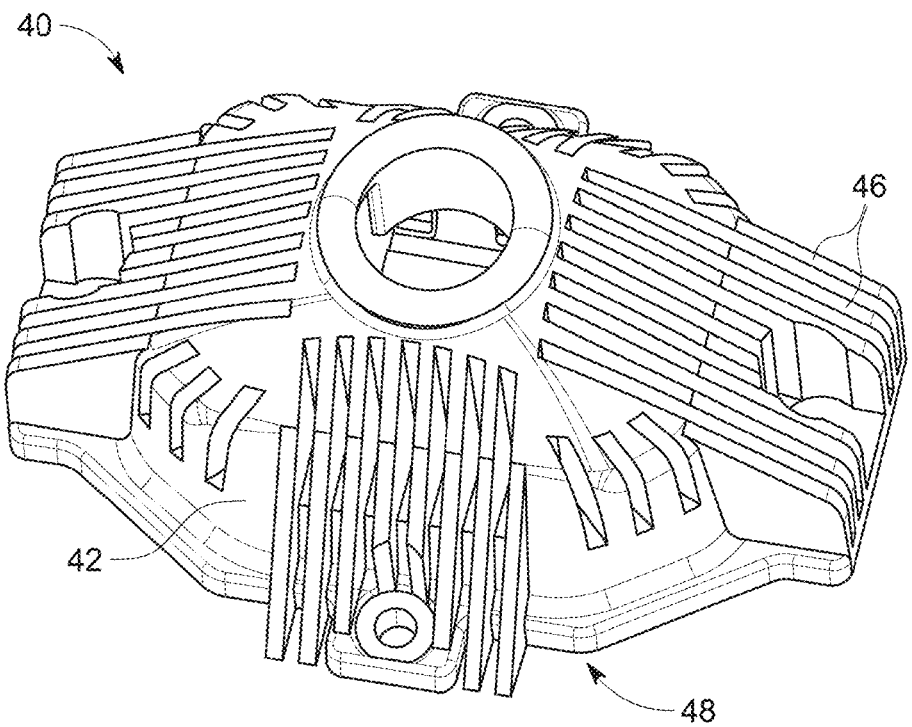
FIGS. 2A-2B are respective front and rear perspective views of a sensor housing for integration with a luminaire according to some embodiments.
Figure 2B:
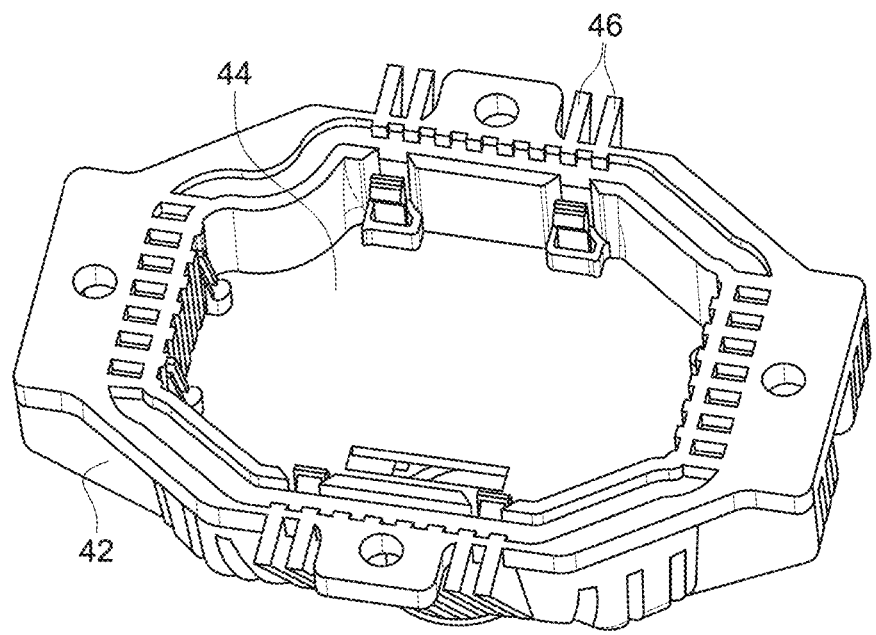
Figure 2C:
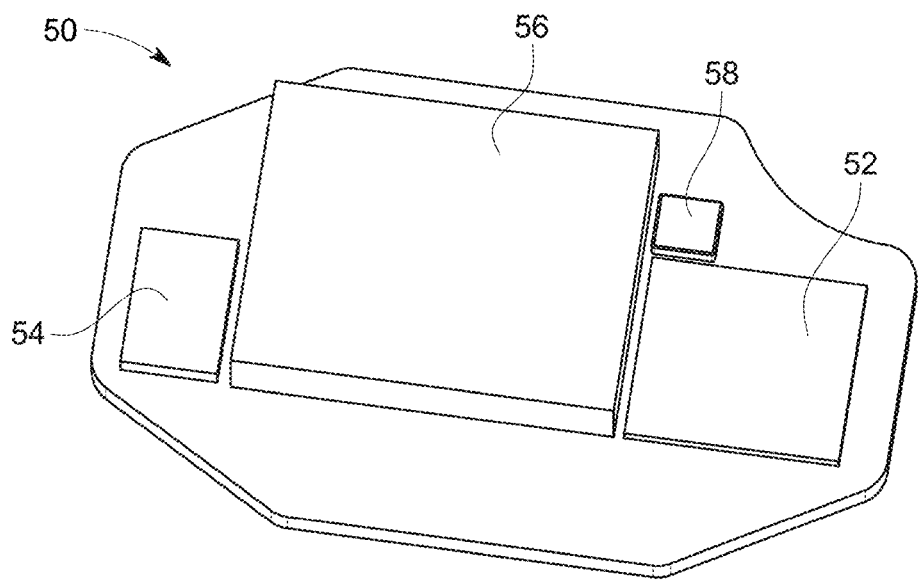
FIGS. 2C-2D are respective front and rear schematic diagrams of a printed circuit board (PCB) configured to support electrical components for powering a sensor housed in the sensor housing of FIGS. 2A-2B according to some embodiments.
Figure 2D:
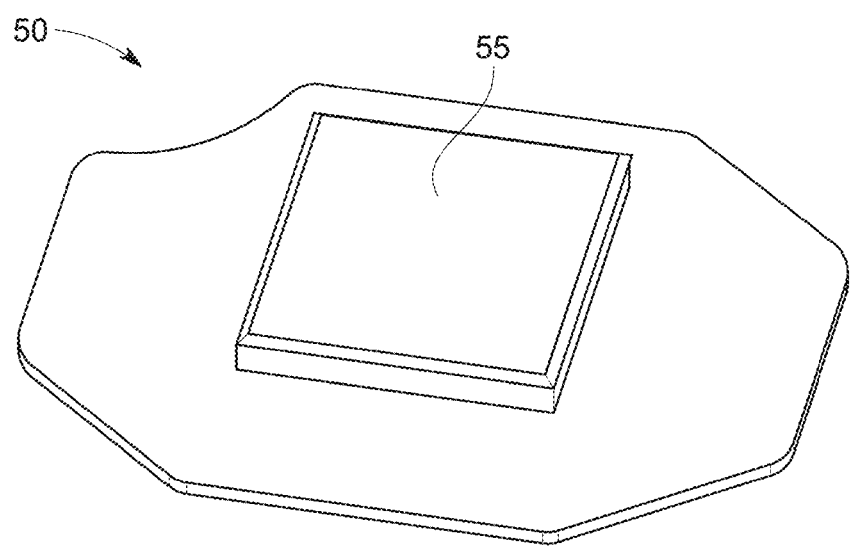

FIGS. 2C-2D are images of the drive circuitry or electrical components associated with powering the sensor being housed in the housing 40. FIG. 2C is a front side of a printed circuit board (PCB), generally designated 50. The PCB 50 can support and/or electrically connect a plurality of components, including but not limited to a processor 52, memory element 54, wireless antenna 56, and a controller 58. A bus connector 55 can be disposed on an opposing side of the PCB 50 in some embodiments as indicated in FIG. 2D. FIGS. 2C-2D are for illustration purposes only, any type or quantity of electrical components may be disposed on or over the PCB 50 other than and/or in addition to those shown. The housings illustrated herein form or comprise heat sinks configured to sink and dissipate heat while also thermally insulate the image sensors disposed therein from other portions of the luminaire.

FIGS. 1A-2D are for illustration purposes only. Numerous modifications and adaptations will be readily apparent to those of skill in the art without departing from the instant subject matter.

II. Sensor Modules for Incorporation in Luminaires

In another aspect, sensor modules are disclosed. In some embodiments, a module comprises a housing and at least one sensor component disposed in the housing, and a heat sink in thermal communication with the housing. Sensor component(s) can comprise sensing element(s) and/or associated electronics. In some embodiments, electronics of the module are disposed in the housing and the sensing element is located remote from the housing. In such embodiments, the sensing element can be connected to the electronics via one or more wires or cables. In other embodiments, the sensing element is in wireless communication with the sensor module electronics. As described herein, the heat sink can form part of the sensor housing. Alternatively, the heat sink can be coupled to one or more surfaces of the sensor housing. In some embodiments, for example, the heat sink can be permanently coupled or reversibly coupled to the sensor housing. The sensor module can have design for integration with a luminaire at one or more locations in the luminaire architecture. The heat sink is configured to dissipate heat from the sensor component(s) and thermally isolate the sensor component(s) from other portions of the luminaire.

In some cases, a plurality of optional heat dissipating structures, not limited to projections, tabs, or fins radiate outwardly from the sensor housing. FIGS. 3A-8F and 15A-17G illustrate various embodiments of sensor modules. Notably, the structures illustrated in FIGS. 3A-8F can also be sensor housings described in Section I hereinabove.

Referring to FIGS. 3A-3D, a sensor module 60 is shown. The module 60 comprises a sensor housing 10 and an image sensor 62 disposed in the housing 10. Although an image sensor 62 is depicted in the module 60, any other type of sensor described in Section I above may be incorporated within the module 60. For example, airflow sensors, chemical sensors, humidity sensors, etc., may also be incorporated into the module 60, where desired. The housing 10 can comprise, consist, and/or contain any and/or all aspects of the housings described hereinabove in Section I. The housing 10 is configured to sink and dissipate heat generated by the image sensor 62 while simultaneously thermally insulating/isolating the image sensor 62 from additional heat-generating components in a luminaire, such as LEDs and driver components.

In some instances, the image sensor 62 is a camera that detects electromagnetic radiation, including but not limited to visible, infrared, or ultraviolet radiation. A lens 61 of the camera is partially or fully disposed in and/or aligned with the housing aperture 26. In certain embodiments, for example, the image sensor 62 can image in the visible and near infrared regions of the electromagnetic spectrum. In some embodiments, the image sensor 62 comprises a complementary metal oxide semiconductor (CMOS) construction. Alternatively, the image sensor comprises a charge coupled device (CCD) architecture. Appropriate image sensors can include those made by the Aptina division of On Semiconductor, by OmniVision or others. In some embodiments, luminaires described herein incorporate an effective motion detection system based upon a visible light focal plane array such as a color or monochrome CMOS camera, in conjunction with imaging lens and digital processing. Appropriate lens assemblies may result in a sensor module field of view from 70 degrees to 120 degrees. Relatively inexpensive camera modules with resolution as low as (640×480) or (1290×960) can deliver fundamental ground sampled resolution as small as 2 cm from a height of 20 feet, more than sufficient to detect major and minor motions of persons or small industrial vehicles such as forklifts.

Additionally, the image sensor 62 can have any desired number of pixels. The pixel number can be selected according to several considerations including sensor size, shape, and desired resolution. The image sensor 62 can be sensitive to light in any desired region of the electromagnetic spectrum. In one embodiment, for example, the image sensor images in the visible and near infrared regions of the electromagnetic spectrum. Details of a CMOS-based image sensor are illustrated in the non-limiting embodiments of FIG. 18.

Figure 3A:
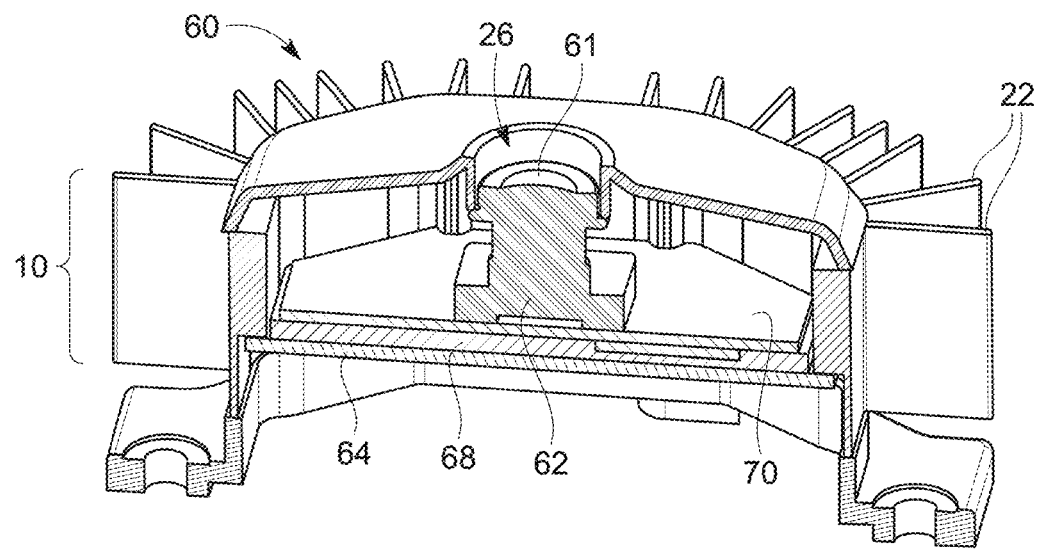
FIGS. 3A-3B are sectional views of a sensor module for integration with a luminaire according to some embodiments.
Figure 3B:
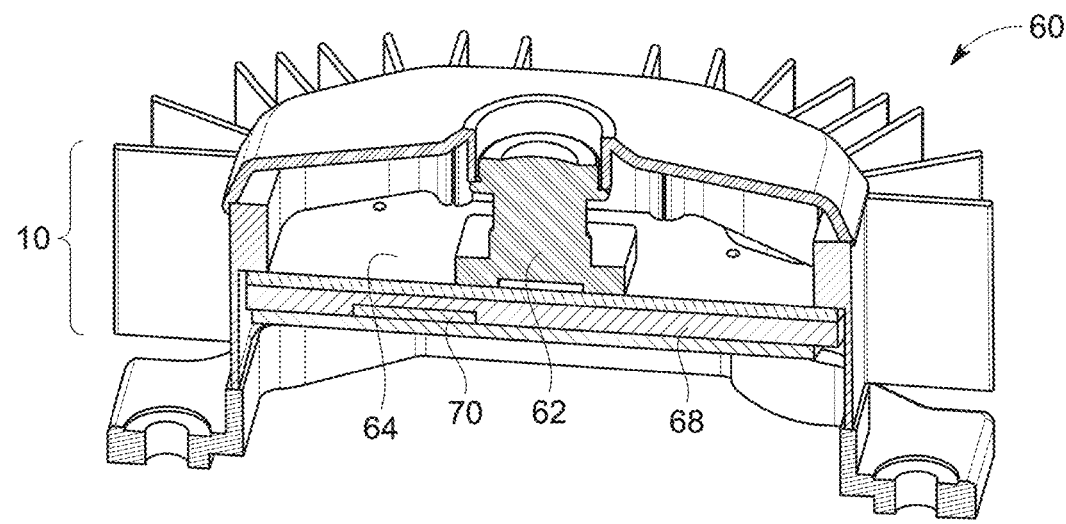

As FIGS. 3A-3B illustrate, the image sensor 62 can be disposed on and/or over a support member 64 and/or a PCB 70. In FIG. 3A, the image sensor 62 is shown as being disposed on or directly over the PCB 70. Alternatively, as FIG. 3B illustrates, the image sensor 62 is disposed on or directly over the support member 64. The support member 64 can comprise a thermally conductive material, such as metal, a thermally conductive polymer, or composite configured to spread heat. The support member 64 can absorb thermal energy or heat generated by the image sensor 62 and be in physical and/or thermal communication with the housing wall 18 and heat dissipating structures 22. The support member 64 is configured to draw heat away from the image sensor 62 for dissipation by heat dissipating structures 22.

Figure 3C:
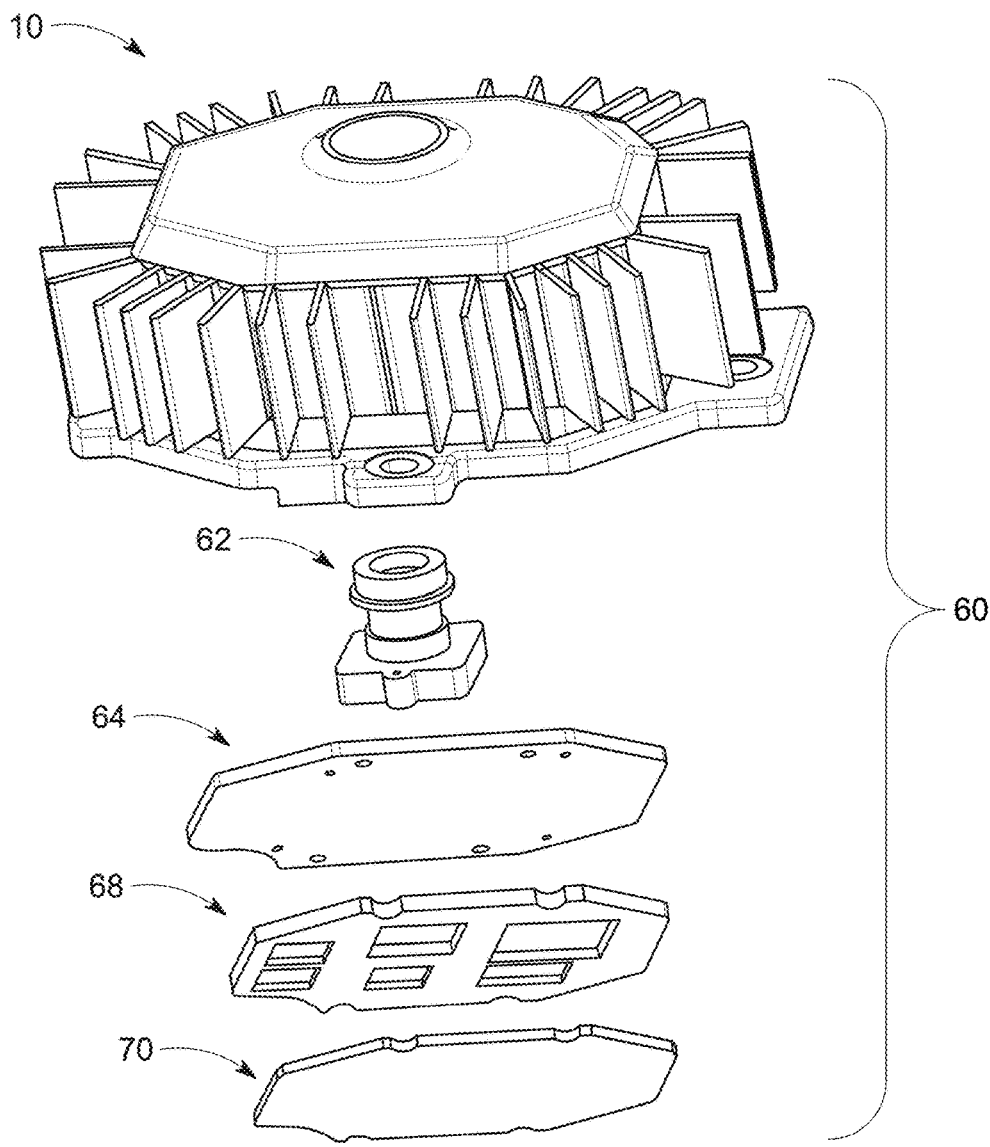
FIG. 3C is an exploded view of a sensor module for integration with a luminaire according to some embodiments.

FIG. 3C is an exploded view of the module 60. The module comprises the sensor housing 10, image sensor 62, support member 64, sensor components disposed on a PCB 70, and an optional spacer 68. The spacer 68 can comprise a partially deformable member, such as a foam, pad, or fibrous mat for filling the space (gap) between the sensor components on the PCB 70 and support member 64. The spacer 68 can comprise a thermally insulating material, in certain embodiments. Alternatively, the spacer 68 is a thermally conductive material that transfers heat to the wall 18 of the housing 10. The spacer 68 can also comprise a potting material formed from a thermoset or thermoplastic material and is generally selected from the group consisting of epoxy resin, polyurethane resin, silicon resin and polyester systems.

Figure 3D:
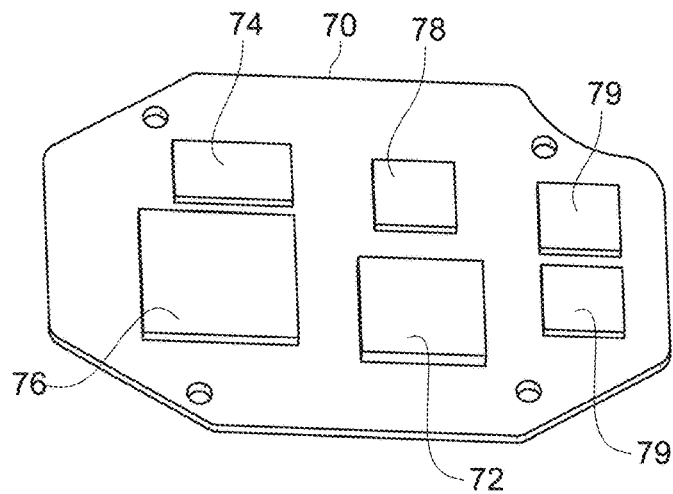
FIG. 3D is a schematic diagram of a PCB configured to support electrical components for powering a sensor disposed in the sensor modules of FIGS. 3A-3C according to some embodiments.

FIG. 3D is a detailed view of the sensor components disposed over the PCB 70. Such components are electrically connected to the image sensor 62 for supplying electrical energy and power thereto. In some embodiments, the sensor components comprise a processor 72, one or more wireless interfaces or antennae 74, a memory element 76, a controller 78, and additional electrical components 79. The additional components 79 can comprise, for example, power conversion components, controlling components, and/or bus circuitry elements. The housing 10 is configured to maintain the sensor 62 and sensor components at temperatures less than 85° C., less than 75° C., less than 65° C., or less than 55° C. The housing 10 can further maintain the image sensor 62 and sensor components at temperatures within 20, 10, or 5° C. of the ambient temperature during operation of the luminaire. In exemplary embodiments, the ambient temperature is less than 85° C., for example, such as between 55° C. and 65° C.

FIGS. 4A-8F illustrate various embodiments of sensor modules having image sensors disposed therein. Portions of the image sensor are visible from the modules, for example, the image sensor lenses are at least visible through the aperture. The sensor housings and/or modules shown in FIGS. 4A-8F are heat sinks comprising symmetrical or substantially symmetrical heat dissipating structures (e.g., fins, projections, etc.). The quantity of dissipating structures can vary depending on size, quantity, and/or amount of heat generated by the image sensor and supporting electronics. FIGS. 4A-7B illustrate modules formed from hybrid housings comprising metal and plastic materials. FIGS. 8A-8F illustrate non-hybrid housings, the majority of which are formed from metal.

Figure 4A:
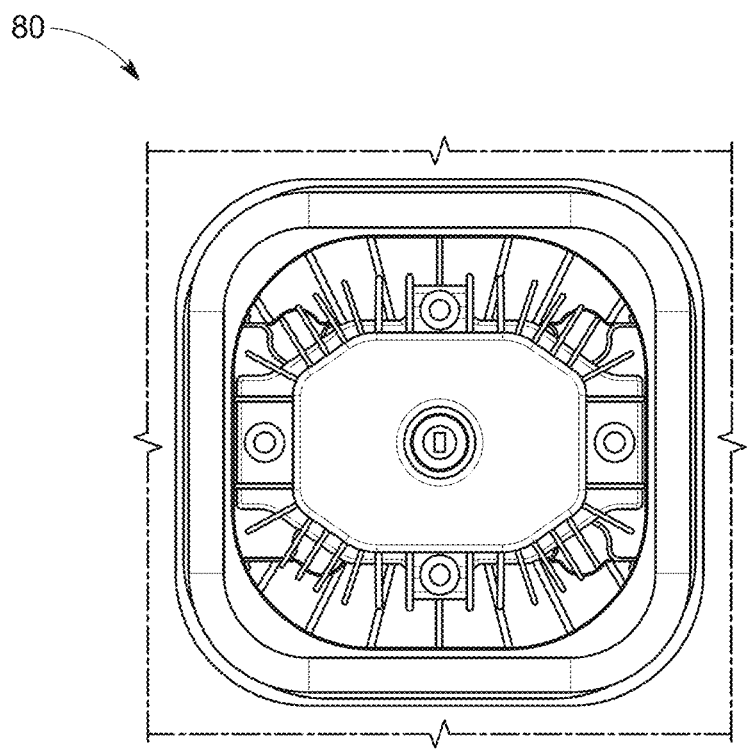
FIGS. 4A-4B are respective front plan and perspective views of a sensor module for integration with a luminaire according to some embodiments.
Figure 4B:
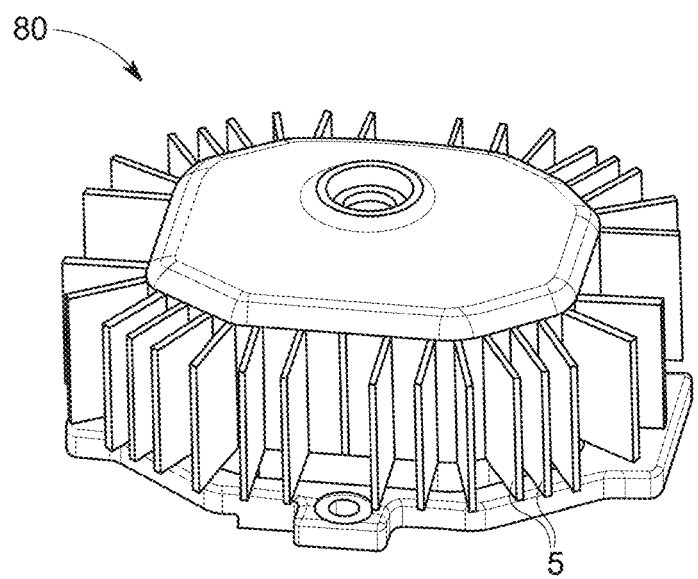
Figure 5A:
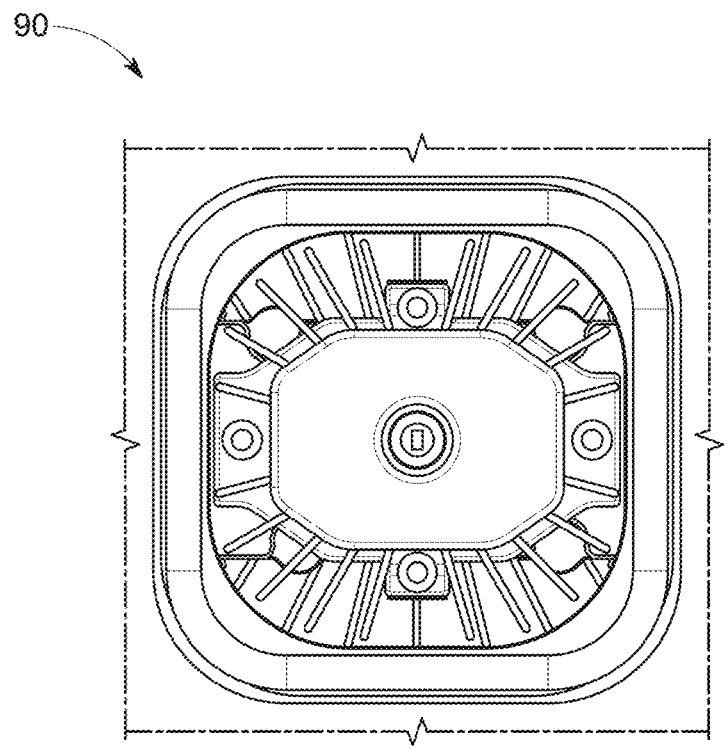
FIGS. 5A-5B are respective front plan and perspective views of a sensor module for integration with a luminaire according to some embodiments.
Figure 5B:
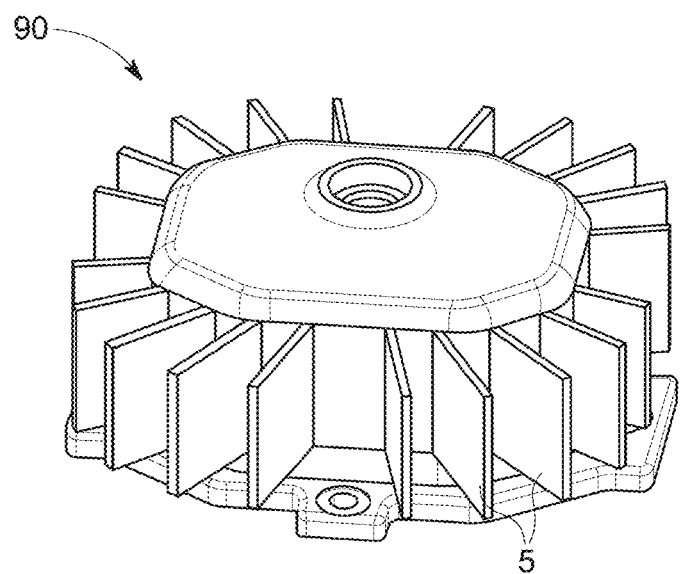
Figure 6A:
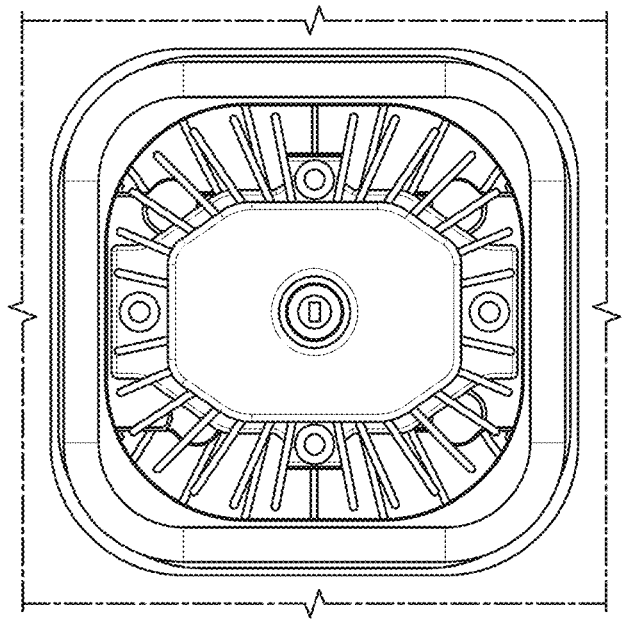
FIGS. 6A-6B are respective front plan and perspective views of a sensor module for integration with a luminaire according to some embodiments.
Figure 6B:
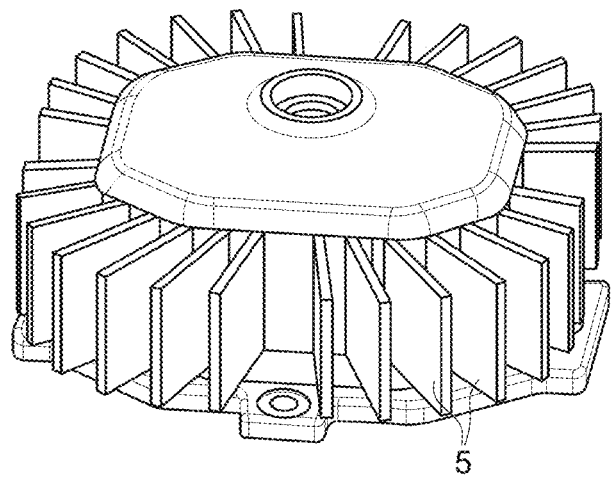
Figure 7A:
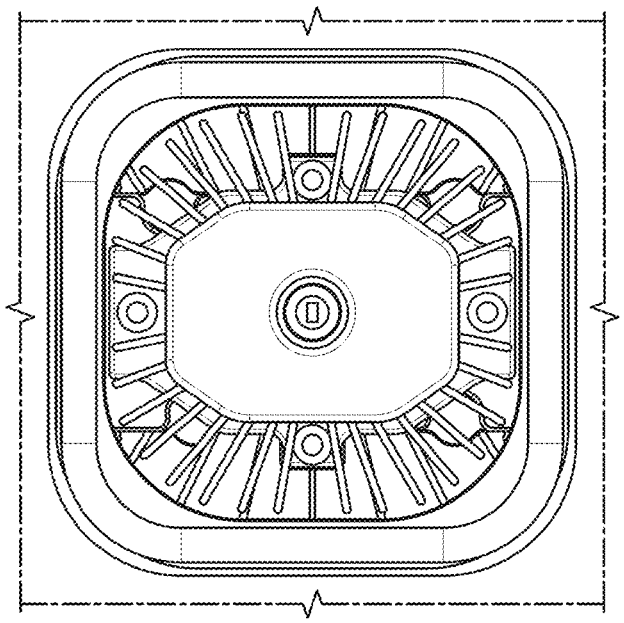
FIGS. 7A-7B are respective front plan and perspective views of a sensor module for integration with a luminaire according to some embodiments.
Figure 7B:
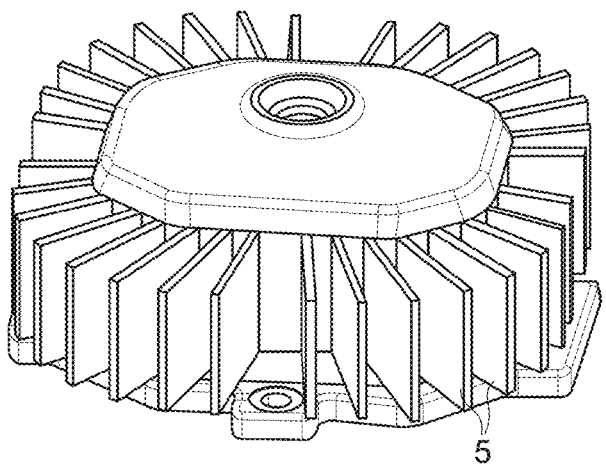

FIGS. 4A-4B illustrate a sensor module 80 having a quantity of 32 heat dissipating structures S, FIGS. 5A-5B illustrate a sensor module 90 having a quantity of 20 heat dissipating structures S, FIGS. 6A-6B illustrate a sensor module 100 having a quantity of 28 heat dissipating structures S, and FIGS. 7A-7B illustrate a sensor module 110 having a quantity of 32 heat dissipating structures S. Each of the modules in FIGS. 4A-7B form heat sinking housings or enclosures having a front cover, a heat dissipating portion comprised of fins, and a rear cover, which collectively dissipate heat and thermally isolate the modules from other portions of a luminaire. The front and/or rear covers can comprise plastic that is overmolded to portions of the fins for keeping the image sensor enclosures air and water tight. Alternatively, the front and/or rear covers are devoid of overmolding. In certain embodiments, the front and/or rear covers are thermally insulating for insulating the image sensor heat sink (housing) from the remainder of the luminaire, including the LED and driver assembly heat sinks.

FIGS. 8A-8F are additional exemplary embodiments of sensor modules. Each module houses a sensor. Although an image sensor is shown in these exemplary embodiments, the sensor is not limited to an image sensor. Rather, the sensor can comprise any other type of sensor as described in Section I above (e.g., light sensors, motion sensors, image sensors, temperature sensors, magnetic field sensors, gravity sensors, humidity sensors, moisture sensors, vibration sensors, pressure sensors, electrical field sensors, sound or noise sensors, physical sensors, environmental sensors, directional sensors, position sensors, velocity sensors, airflow sensors, chemical sensors (e.g., $CO_2$ sensors, $O_2$ sensors, etc.), electrical sensors, or any combination thereof).

Figure 8A:
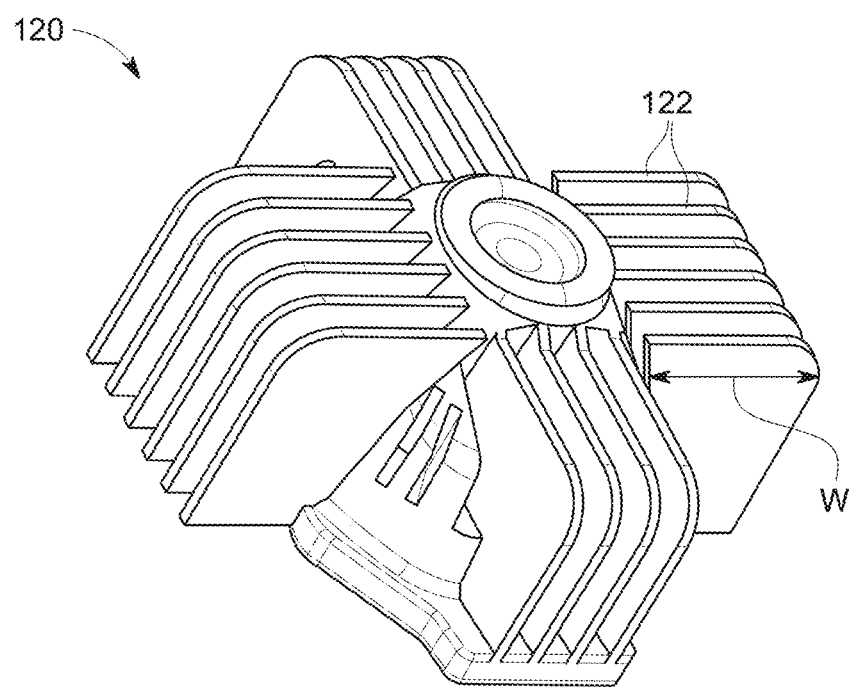
FIGS. 8A-8F are perspective views of various sensor modules for integration with a luminaire according to some embodiments.

FIG. 8A is a sensor module 120 having extended fins 122. The fins 122 can be rotationally symmetric relative to an axis of symmetry passing through the center of the module 120. The fins can comprise a width W that is greater than 10 mm, greater than 20 mm, greater than 50 mm, or greater than 150 mm. Any size, shape, and/or quantity of fins 122 not inconsistent with the instant disclosure can be provided.

Figure 8B:
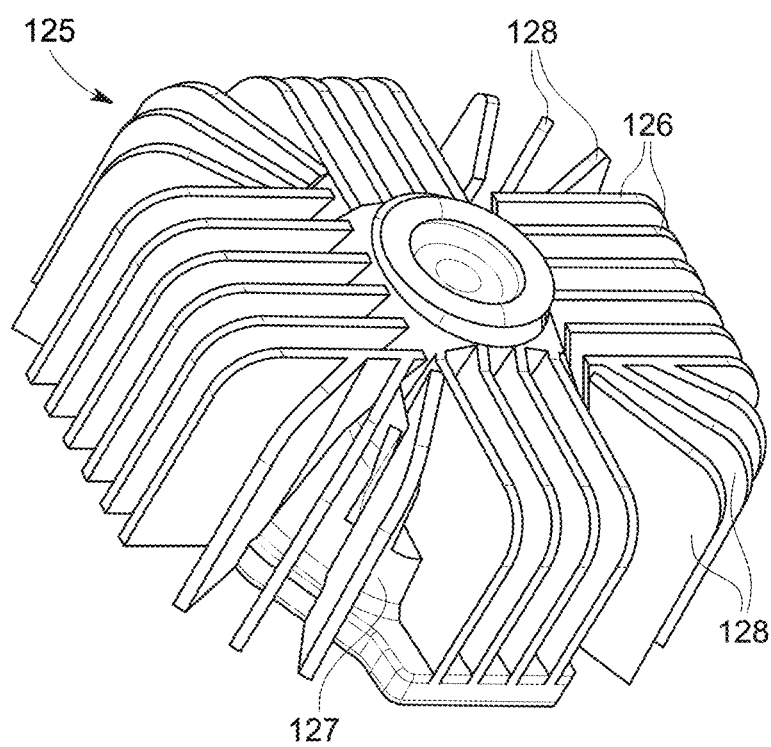

FIG. 8B is sensor module 125 comprising a plurality of primary fins 126 orthogonally disposed relative to the outer wall of the module. A plurality of secondary (corner) fins 128 are connected, attached, and/or otherwise disposed on the primary fins 126. In certain embodiments, the corner fins 128 branch outwardly from and are acutely angled relative to the primary fins 126 to which they are attached. Alternatively, the corner fins 128 can be attached directly to portions of the sensor housing, such as the outer wall 127 of the sensor housing.

Figure 8C:
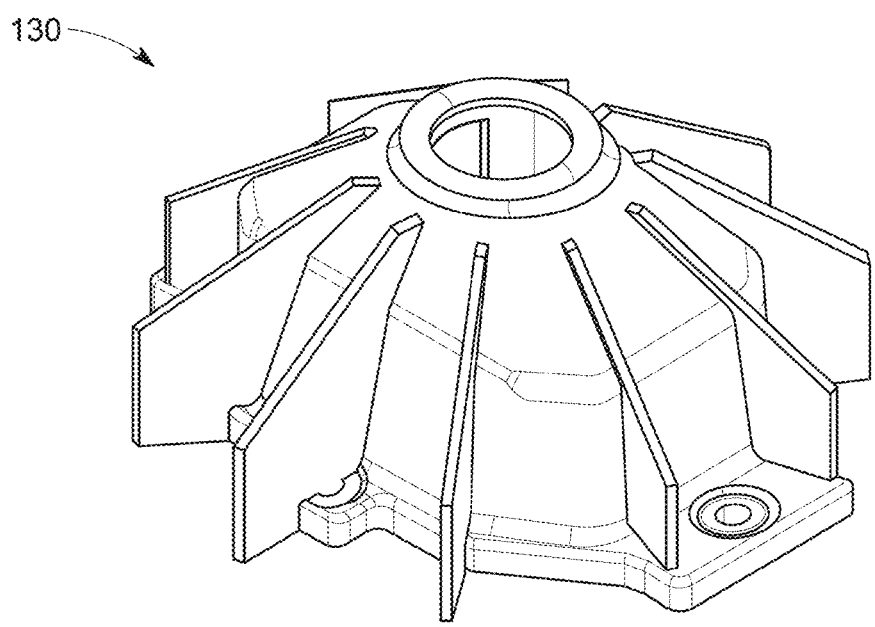
Figure 8D:
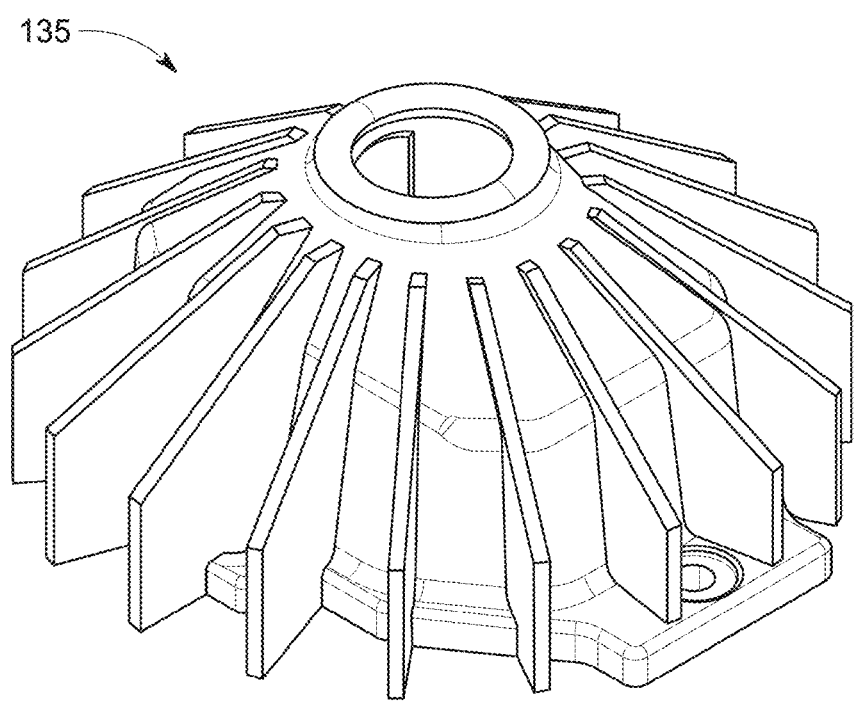
Figure 8E:
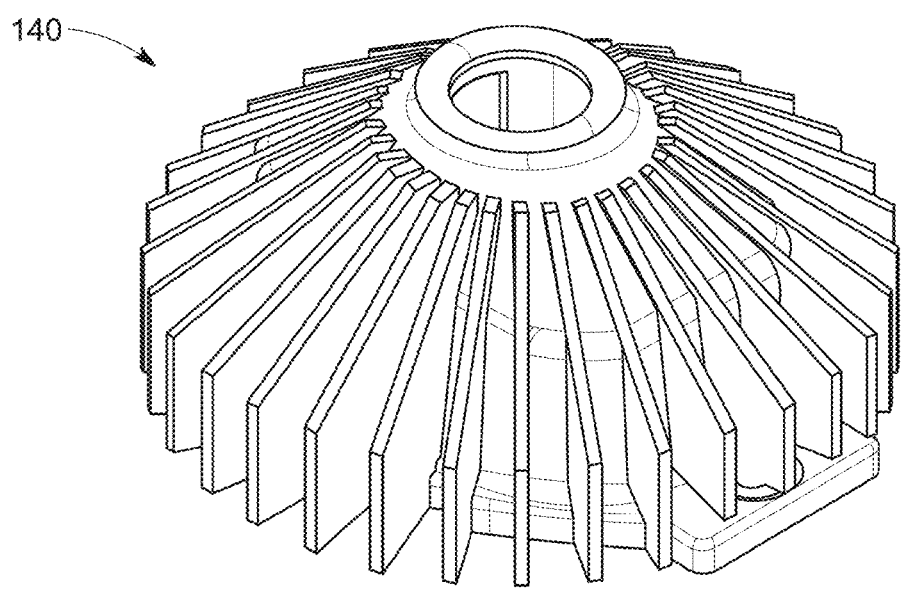

FIG. 8C is a module 130 comprising a quantity of 10 fins, FIG. 8D is a module 135 comprising a quantity of 18 fins, and FIG. 8E is a module 140 comprising a quantity of 32 fins. The fins extend from the base of the module to the front face comprising the aperture. The fins can be rotationally symmetric around the image sensor for uniform heat dissipation. Alternatively, the fins can be non-symmetric. Any size, shape, and/or quantity of fins can be provided, as desired, for facilitating improved and application-specific heat sinking. The sensor housings and modules can be incorporated in high-bay luminaires, low-bay luminaires, down lighting luminaires, indoor luminaires, or outdoor luminaires, in some instances.

Figure 8F:
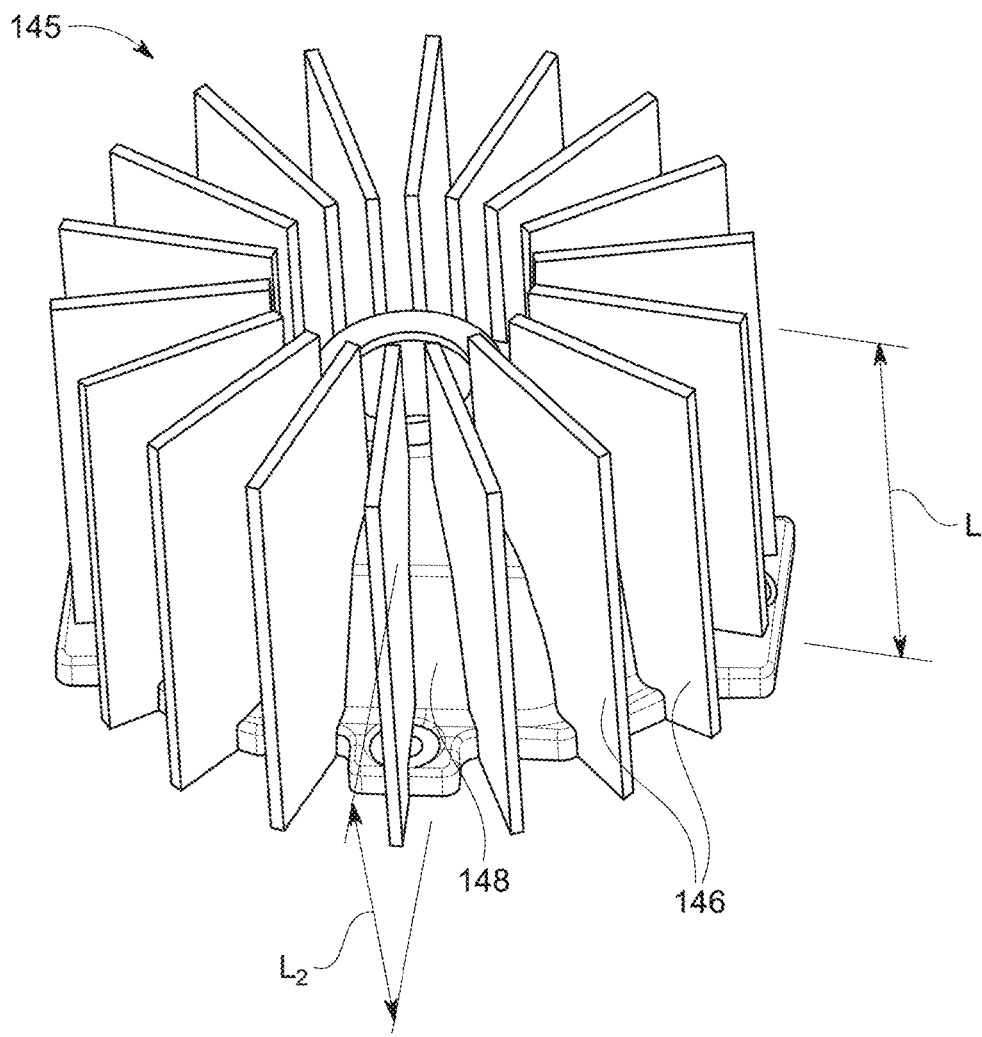

FIG. 8F is a module 145 comprising elongated fins 146. The fins 146 can comprise a height or length L that is greater than 10 mm, greater than 20 mm, greater than 50 mm, or greater than 150 mm. Any size, shape, and/or quantity of fins 126 not inconsistent with the instant disclosure can be provided.

As FIG. 8F illustrates, the sensing module comprises an outer wall 148 having a wall height L2 as measured along the z-axis defined between the front face and the rear face of the module. Each of the plurality of fins 126 comprises a fin height or length L as measured along the z-axis, and the fin height of each fin is or greater than the wall height. Alternatively, as the other embodiments illustrate, each fin is approximately the same height as the outer wall from which the fins extend. The fins 126 can be at least 5 mm greater in length than the housing body or wall (18, FIG. 1B), at least 10 mm greater in length than the housing body, at least 1 inch greater in length than the housing body, or between 1-6 inches greater in length than the housing body.

FIGS. 9-14 are luminaires incorporating sensors housings and/or modules according to some embodiments and are described in more detail in section III below.

FIGS. 15A-17G illustrate further embodiments of sensor modules for integration with luminaires. Referring to FIGS. 15A-15D in general, various views of a further embodiment of a sensor module, generally designated 300, is shown. Module 300 comprises a first portion 302, a second (intermediate) portion 304, and a third portion 306. The first portion 302 is an image sensor cover or enclosure, the second portion 304 is a heat sinking portion, and the third portion 306 is a thermally insulating portion configured to thermally isolate the module 300 from the rest of the luminaire.

Figure 15A:
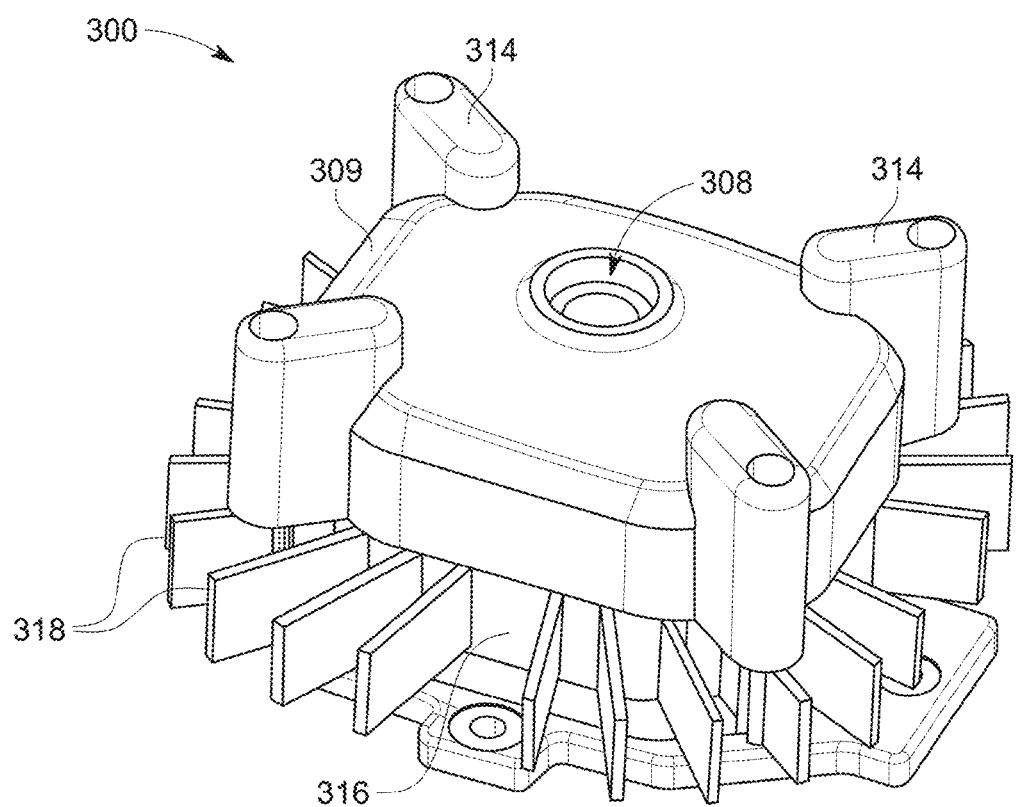
FIG. 15A is a perspective view of a sensor module for integration with a luminaire according to some embodiments.

The first portion 302 of the module 300 can define a housing or enclosure for disposal around an image sensor 310. A lens 312 of the image sensor 310 is aligned with an aperture 308 defined in a front face 309 of the first portion 302. The first portion 302 of the module 300 further comprises one or more attachment regions 314 configured to receive one or more attachment or fastening members F (15C). The attachment regions 314 can, in some embodiments, protrude from the front face 309 and side regions of the first portion 302 of the module 300. Notably, the attachment regions 314 can protrude in directions that are substantially parallel and/or normal to a central axis Ax of the module 300. The attachment regions 314 form protective protrusions/projections that protect the lens 312 of the image sensor 310 from physical or mechanical damage during use. Such regions 314 also receive and retain fastening members F via openings 314A defined therein. The fastening members F can extend through respective openings aligned in each of the first, second, and third portions of the module 300 when the module is assembled. Views of an assembled module are depicted in FIGS. 15A and 15B.

Still referring to FIGS. 15A-15D and in some cases, the second portion 304 of the module 300 forms or defines a heat sinking body constructed from a thermally conductive material, such as metal, a thermally conductive composite, or a thermally conductive polymer or plastic. The second portion 304 of the module 300 can comprise a body structure 316 and one or more heat dissipating structures 318 extending from the body structure 316. The body structure 316 can surround and/or encircle portions of the image sensor 310 and a PCB 320 supporting the image sensor, such that heat is channeled away from the sensor and sensor electronics during use. Heat can readily dissipate from the module via dissipating structures 318. The body structure 316 is also in thermal contact with the PCB 320 supporting the image sensor 310 and also various electronic sensor components 322 that power the sensor 310.

The third body portion 306 can be formed from an insulating material, such as a plastic, polymer, ceramic, or potting material. The third body portion 306 insulates and/or thermally isolates the module 300 from other portions of the luminaire to which it is attached. The module 300 and portions thereof, improve the ease of assembly by virtue of being assembled in one plane via fasteners F without having to rotate portions the housing.

Figure 15B:
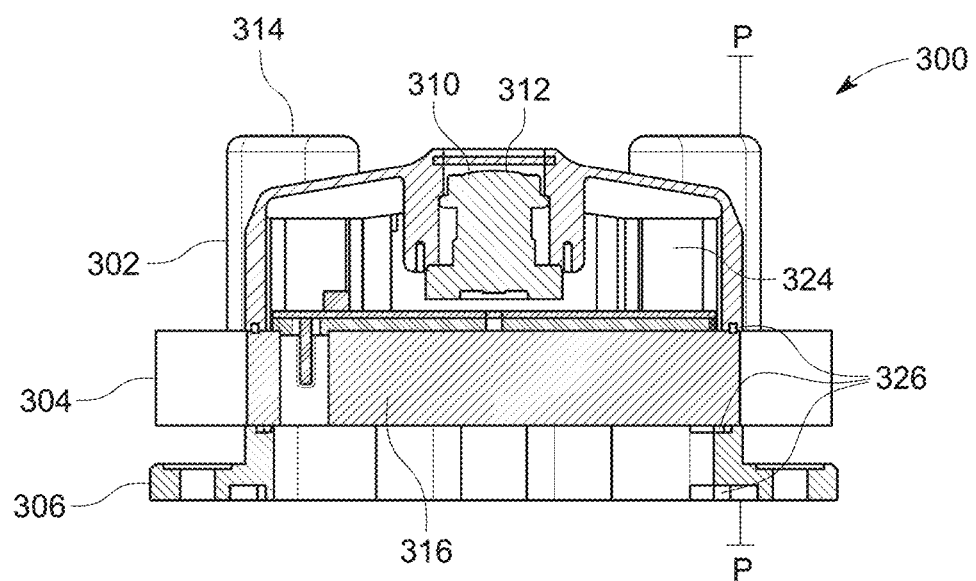
FIG. 15B is a sectional view of the sensor module in FIG. 15A.
Figure 15C:
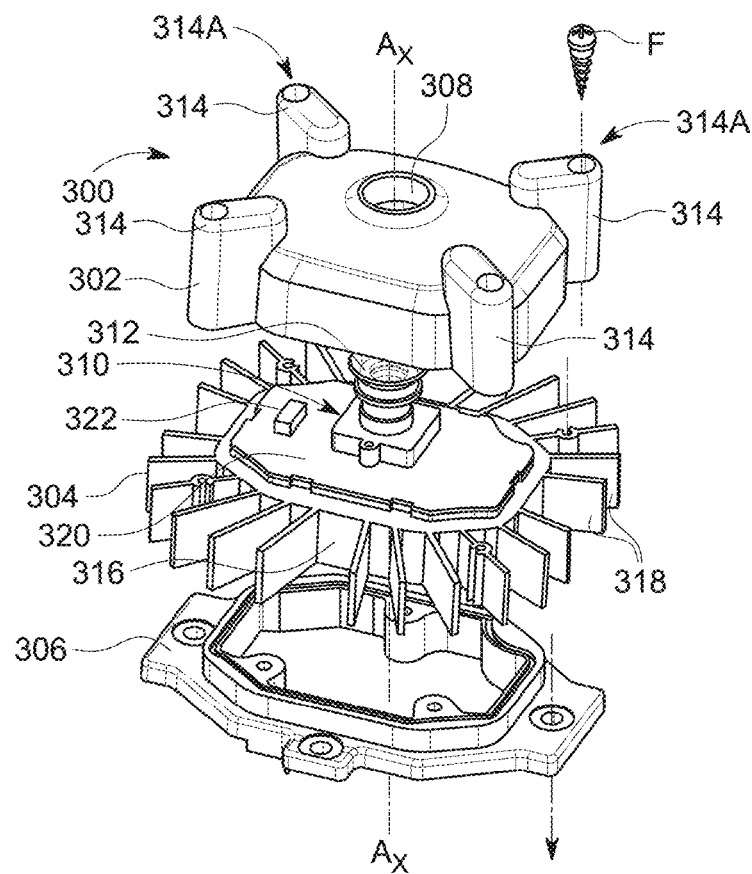
FIGS. 15C-15D are respective front and rear exploded views of the sensor module in FIG. 15A.
Figure 15D:
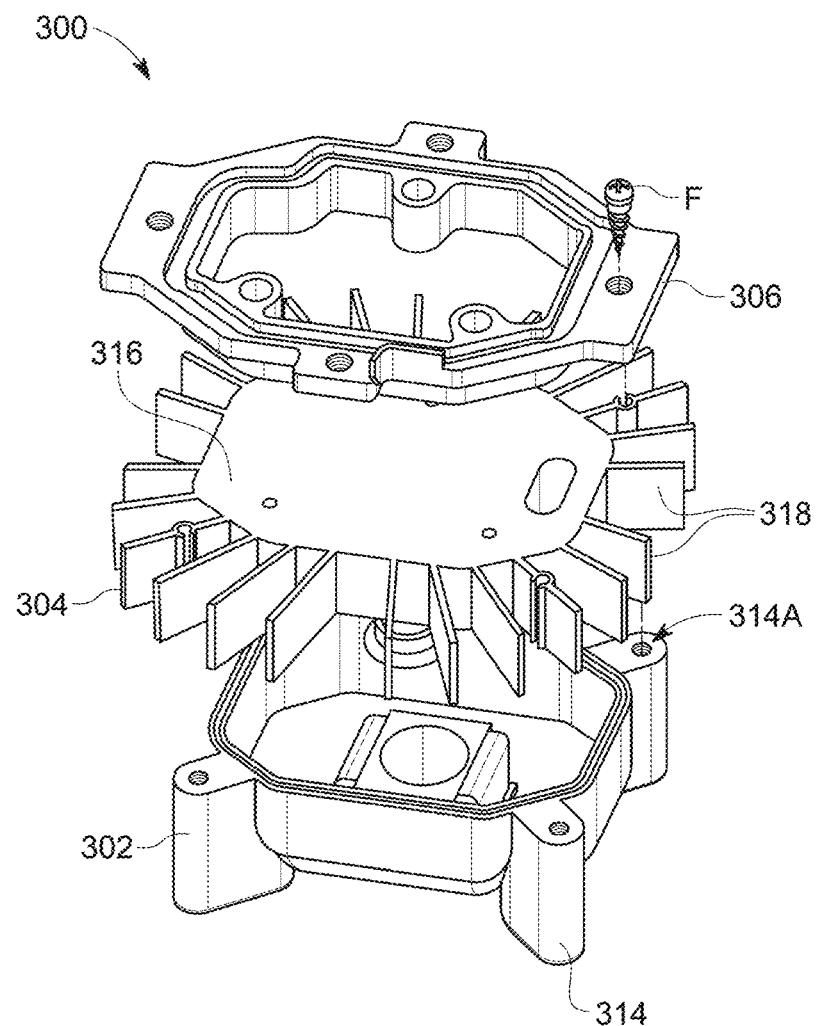

As FIG. 15B illustrates and in some cases, one or more ingress sites 326 of the module 300 are disposed along a same plane P. The ingress sites 326 sealed sites configured to form an air and dust tight cavity 324 around the image sensor 310 and PCB 320. The cavity 324 is defined between portions of the PCB 320, image sensor 310, and the front cover (i.e., first portion 302). Notably, the image sensor 310, sensor components 322, and PCB 320 are disposed over and/or in contact with the heat sinking body structure 316. The fasteners F can comprise threaded screws that are inserted and assembled in a top-down configuration (FIG. 15C) or a bottom up configuration (15D).

Figure 16A:
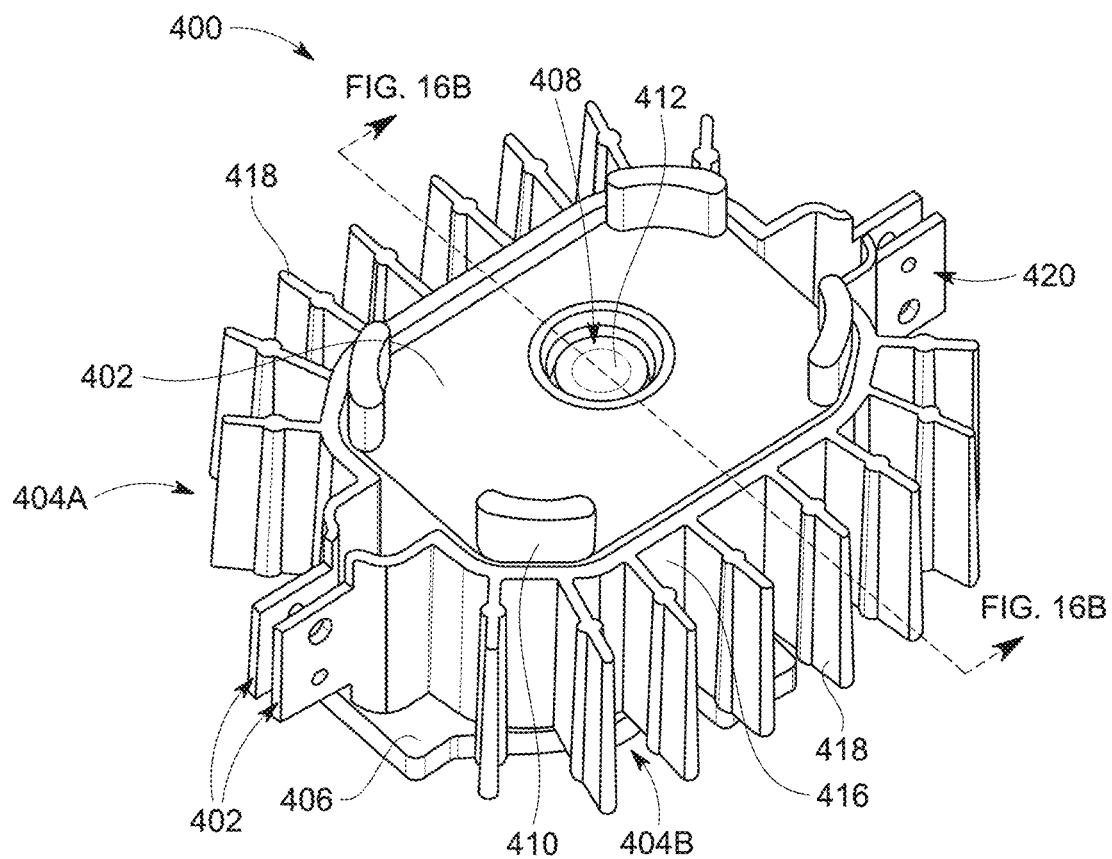
FIG. 16A is a perspective view of a sensor module for integration with a luminaire according to some embodiments.
Figure 16B:
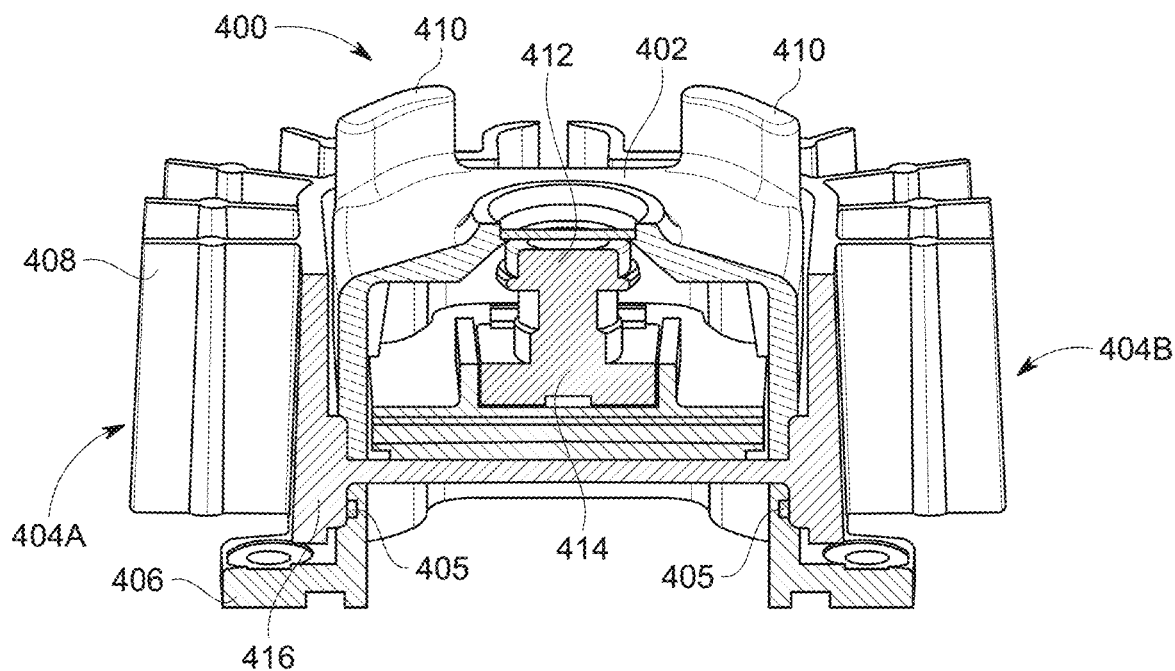
FIG. 16B is a sectional view of the sensor module in FIG. 16A.
Figure 16C:
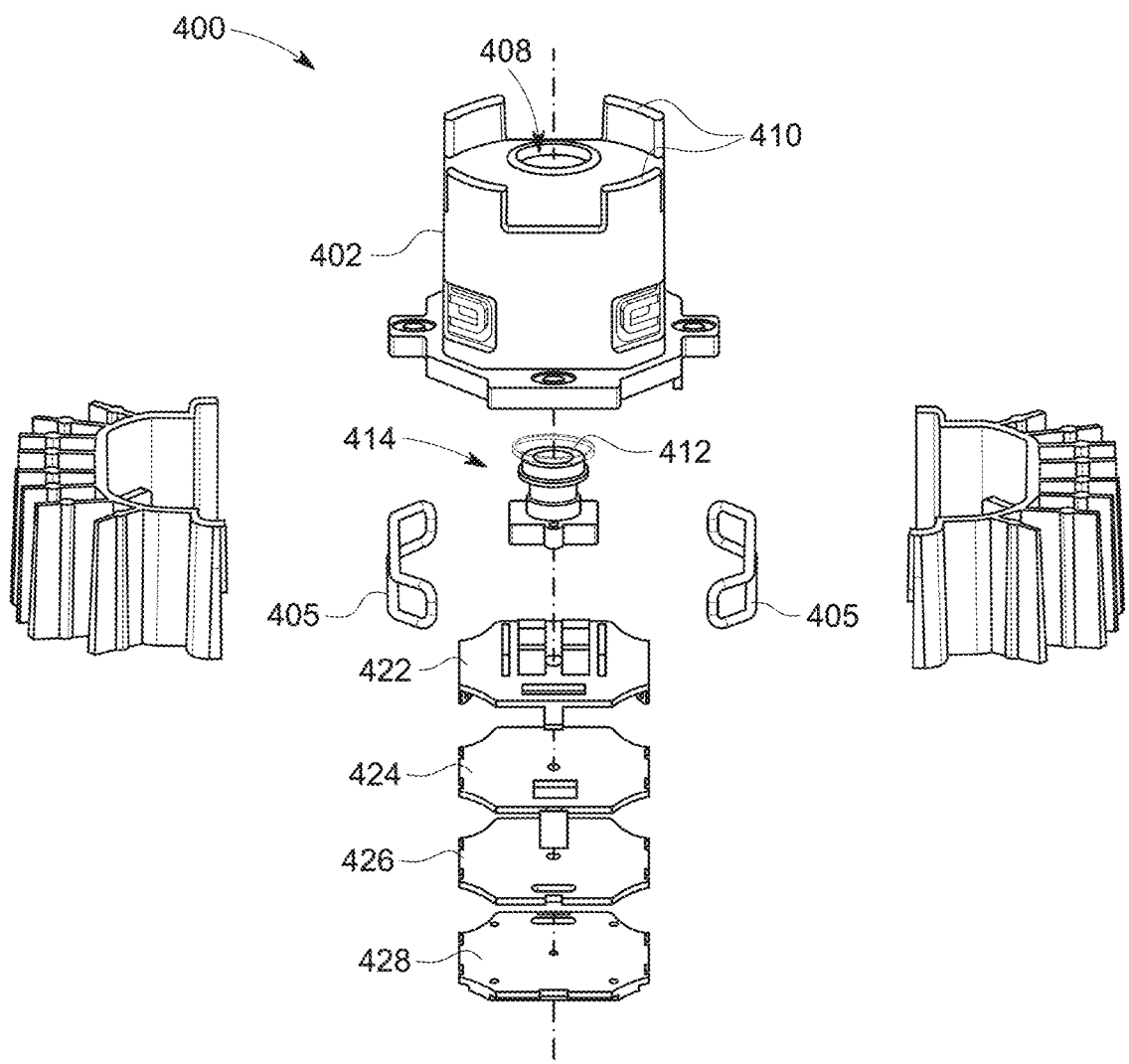
FIG. 16C is an exploded view of the sensor module in FIG. 16A.

FIGS. 16A-16C illustrate aspects relating to yet a further embodiment of a sensor module, generally designated 400. In this embodiment, the heat sinking portions of the module 400 are separable from each other and thus attachable and detachable relative to each other and a housing member 402 of the module 400. The module comprises a housing member 402, multiple discrete heat sinking portions 404A, 404B, and a base 406. The housing member 402 can seal an image sensor therein, the heat sinking portions 404A, 404B can dissipate heat generated by the image sensor, and the base 406 can thermally insulate the module 400 from other portions of a luminaire.

The housing member 402 comprises an aperture 408 and one or more stands, tabs, or projection regions or portions 410 that extend above portions of the housing member 402 to protect a lens 412 of an image sensor 414 (FIG. 16B) from damage. The housing member 402 can contact, engage, and/or thermally communicate with the heat sinking portions 404A, 404B of the module 400. One or more sealing members 405 (FIG. 16B) can be compressed between portions of the housing member 402 and heat sinking portions 404A, 404B upon sealing to tightly seal the module 400. The sealing members 405 can comprise O-rings, gaskets, or any other type of compressible/depressible seals comprised of elastomeric, polymeric, plastic, or potting material not inconsistent with the instant disclosure.

The first and second heat sinking portions 404A and 404B can be disposed or located around a perimeter of the housing member 402. Each heat sinking portion 404A, 404B comprises, consists, or consists essentially of a body 416 and a plurality of heat dissipating structures 418 extending from the body 416. The heat dissipating structures 418 can comprise and/or be formed from fins or blades having non-uniform thicknesses, where thicker and thinner portions or regions along a length and/or width thereof collectively define convective channels by which heat dissipates into the surrounding air.

Each heat sinking portion further comprises one or more coupling regions 420 whereby one heat sinking portion (e.g., 404A) is fastened, connected, joined, attached, or otherwise coupled to at least one other heat sinking portion (e.g., 404B) end-to-end. The coupling regions 420 can be connected via one or more fastening members (not shown), such as, but not limited to one or more clips, ties, pins, hooks, screws, rivets, nuts, bolts, etc. The fastening members (not shown) can move or compress the heat sinking portions 404A, 404B towards each other for compressing the sealing members 405 against the housing member 402 and facilitating a tightly sealed module 400. Although only two heat sinking portions (i.e., 404A and 404B) are illustrated, more than two heat sinking portions can be provided per module 400, where desired. As FIG. 16B illustrates, the heat dissipating structures 418 of heat sinking portions 404A, 404B can be substantially horizontally aligned with the image sensor 414 and fully surround the sensor for improved thermal management.

FIG. 16C is an exploded view of module 400. As FIG. 16C illustrates, the module 400 comprises a housing member 420, one or more detachable, discrete, and/or separable heat sinking portions 404A, 404B, and a thermally insulating base 406. The image sensor 414 is disposed on or over a carrier or carrying structure 422. The image sensor 414 is configured to be received in and fittingly engage portions of the carrying structure 422. In certain embodiments, the image sensor 414 snaps in/out of the carrying structure 422. The carrying structure 422 can be thermally conductive or improved heat spreading, or not thermally conductive.

In some instances, the carrying structure 422 is disposed on or over a control PCB 424. The control PCB 424 supports the image sensor 414 and various sensor components as previously described above (e.g., a processor, memory, etc.). The PCB 424 can comprise a metal core printed circuit board or FR4 board having traces and/or electrical connectors disposed thereon/in for powering and/or controlling aspects relating to the image sensor 414.

The PCB 424 can be disposed on or over a gap pad 426. The gap pad 426 can comprise or be formed from a thermally conductive material disposed between the PCB 424 and a thermally conductive supportive plate 428. The gap pad 426 can form a thermal interface between various components in the module 400 while advantageously eliminating air gaps to reduce thermal resistance in the module 400. The gap pad 426 can also be a conformable and cushioning material for reduce interfacial resistance and providing low-stress vibration dampening for the sensor components and/or the image sensor 414 that are each disposed on or over the gap pad 426, where desired.

The image sensor 414 can be sealed between portions of the housing member 402 and the supportive plate 428. The supportive plate 428 can improve thermal management in the module 400 via spreading heat to heat sinking portions 404A, 404B for dissipation from the module 400. Of note, the carrying structure 422, gap pad 426, and/or supportive plate 428 are each optional, and not necessarily disposed in each module as described herein.

FIGS. 17A-17G illustrate aspects relating to each of the respective carrying structure 422, PCB 424, gap pad 426, supportive plate 428, first heat sinking portion 404A, housing member 402, and second heat sinking portion 404B.

Figure 17A:
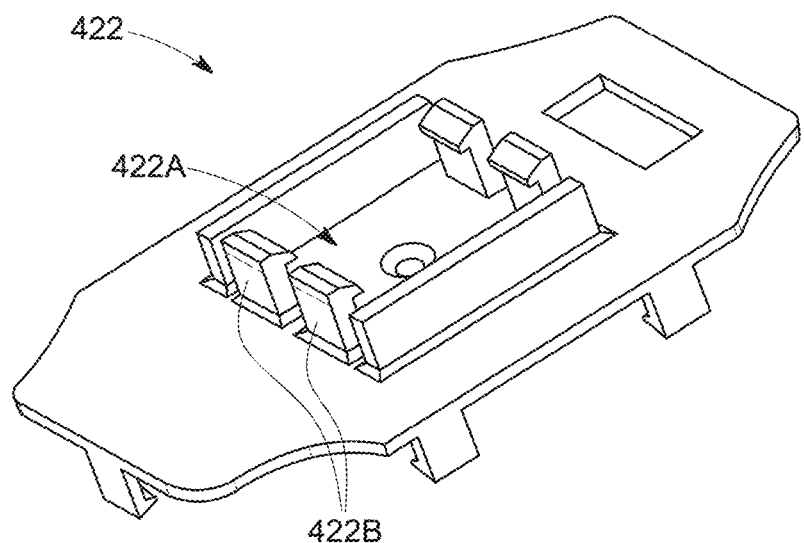
FIGS. 17A-17B are respective front and rear views of a carrying structure for integration with a sensor housing and/or module according to some embodiments.

As FIG. 17A illustrates, the carrying structure 422 can comprise an image sensor retaining region 422A. The retaining region 422A is sized and/or shaped to receive and/or retain portions (e.g., a base or footprint) of the image sensor 414 (FIG. 16C). The retaining region 422A can comprise one or more retaining legs 422B that deform to provide a snap-fit retaining structure around an image sensor base.

Figure 17B:
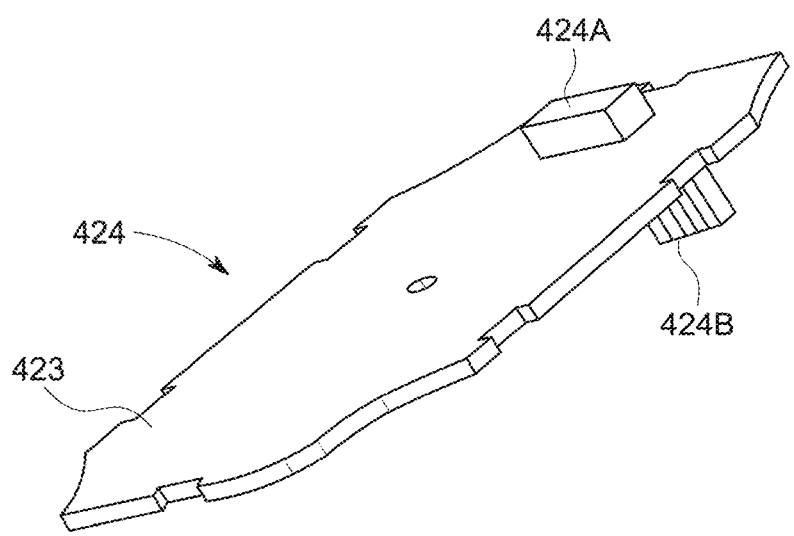

As FIG. 17B illustrates, the PCB 424 comprises a front face 423 over which the carrying structure 422, image sensor 414, and various sensor electronics 424A are supported. An electrical connector 424B extends or protrudes from the PCB 424 and connects to an electrical receptacle or socket (not shown) in the luminaire, which powers the image sensor and related electronics. The electrical connector 424B extends through apertures in the gap pad 426 and supportive plate 428.

Figure 17C:
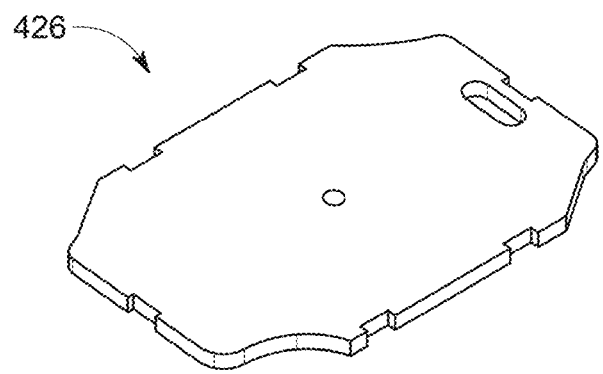
FIGS. 17C-17D are front and rear perspective views of a thermal interface for integration with a sensor housing and/or module according to some embodiments.
Figure 17D:
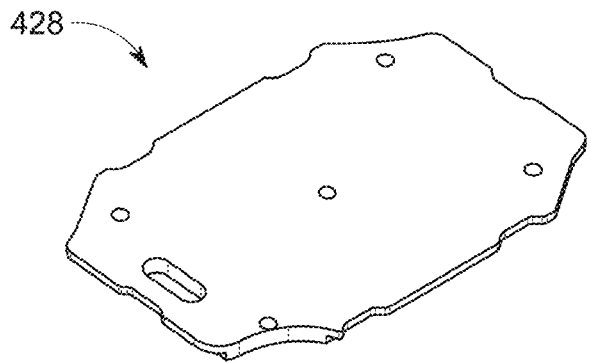

FIG. 17C is the gap pad 426. The gap pad serves as a deformable and cushioning thermal interface between the PCB 424 and supportive plate 428. In FIG. 17D, the supportive plate 428 serves as a heat spreading and supportive structure for the image sensor in the module 400.

Figure 17E:
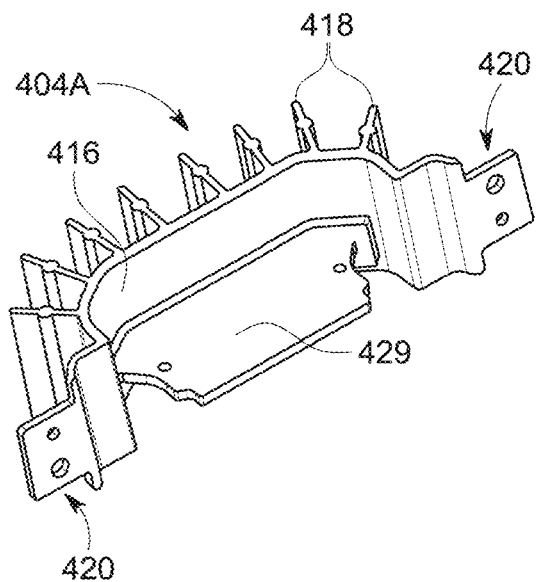
FIG. 17E is a perspective view of a first heat sinking portion for integration with a sensor housing and/or module according to some embodiments.
Figure 17F:
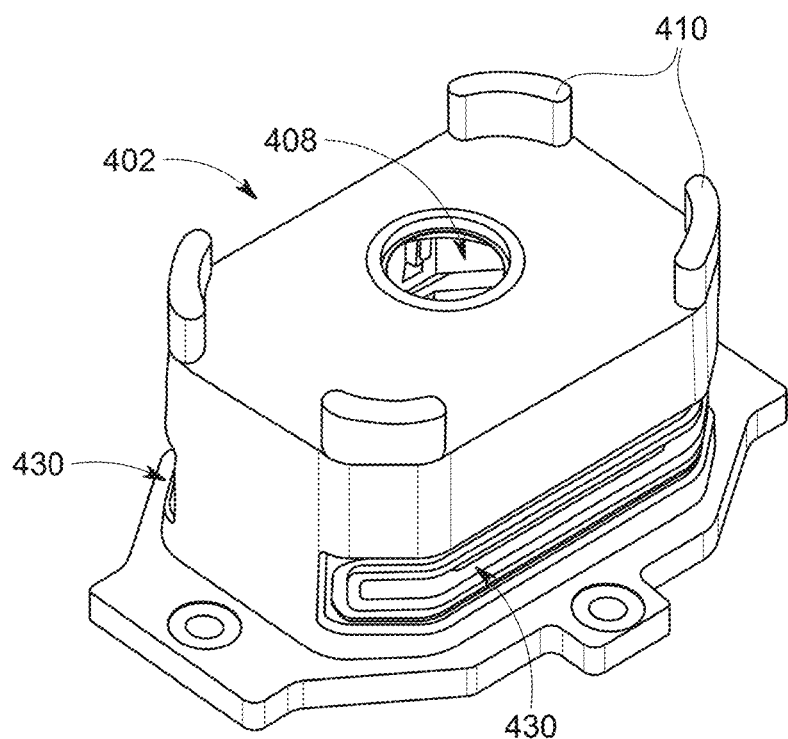
FIG. 17F is a perspective view of a housing portion of a sensor housing for integration with a luminaire according to some embodiments.
Figure 17G:
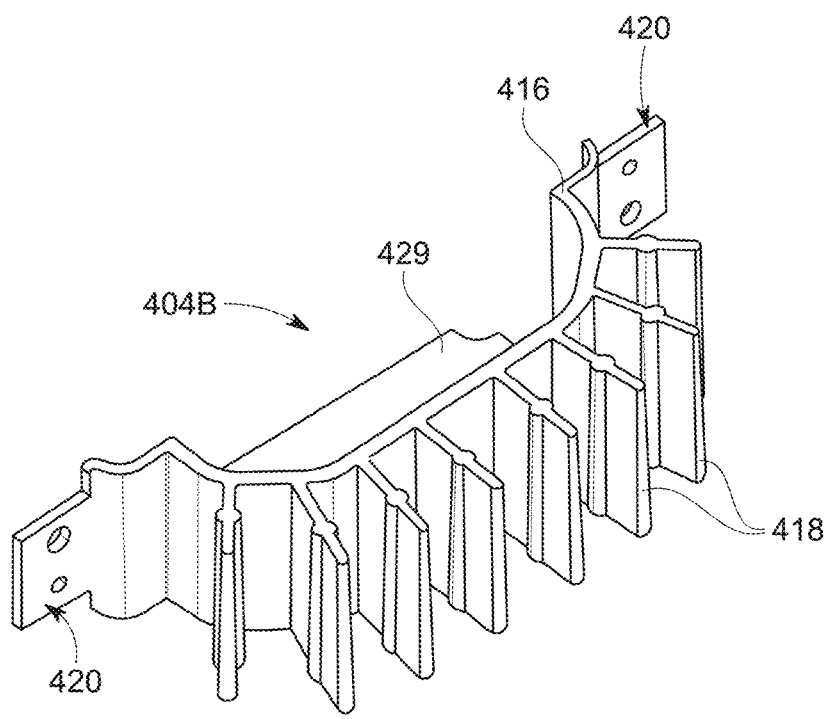
FIG. 17G is a perspective view of a second heat sinking portion for integration with a sensor housing and/or module according to some embodiments.

FIGS. 17E and 17G illustrate the first and second heat sinking portions 404A and 404B. The first heat sinking portion 404A comprises opposing coupling ends 420 which connect to and/or engage similar coupling ends 420 disposed on the second heat sinking portion 404B. Each heat sinking portion comprises a support 429, which is a planar or non-planar structure configured to support the supportive plate 428 and other components disposed in the module 400.

FIG. 17F illustrates the housing member 402. The housing member 420 can be centrally or non-centrally disposed between the first and second heat sinking portions 404A, 404B. The housing can comprise a plurality of projecting portions 410 which protect the lens of the image sensor from damage. A plurality of retaining slots, channels, or grooves 430 are formed or otherwise disposed in portions of the housing member 402 for receiving and retaining sealing members 405 (FIG. 16B) that seal portions of the module 400 from moisture, liquids, solids, and/or dust.

FIGS. 4A-17G are for illustration purposes only. Numerous modifications and adaptations will be readily apparent to those of skill in the art without departing from the instant subject matter.

III. Luminaires Comprising Sensor Modules

In a further aspect, luminaires incorporating sensor housings and modules are described herein. Such luminaires can comprise any of the housings and/or modules described hereinabove in Sections I and II. Any size, shape, and/or type of luminaire not inconsistent with the instant disclosure can incorporate the sensor housings and modules described in Sections I and II.

A luminaire comprises a driver assembly thermally coupled to a first heat sink, a light emitting diode (LED) assembly thermally coupled to a second heat sink, and a sensor module. The sensor module comprises a housing, at least one sensor component disposed in the housing and a heat sink in thermal communication with the housing. The module heat sink can be thermally insulated from one or each of the first and second heat sinks. In some cases, the first heat sink is also thermally insulated from the second heat sink. The first, second, and module heat sinks can optionally be disposed in a vertically stacked configuration. The sensor incorporated with the luminaires described herein can comprise an image sensor (e.g., a camera) or any other type of sensor described in Sections I and/or II above. Additionally, more than one sensor may be provided per luminaire, where desired.

Figure 9A:
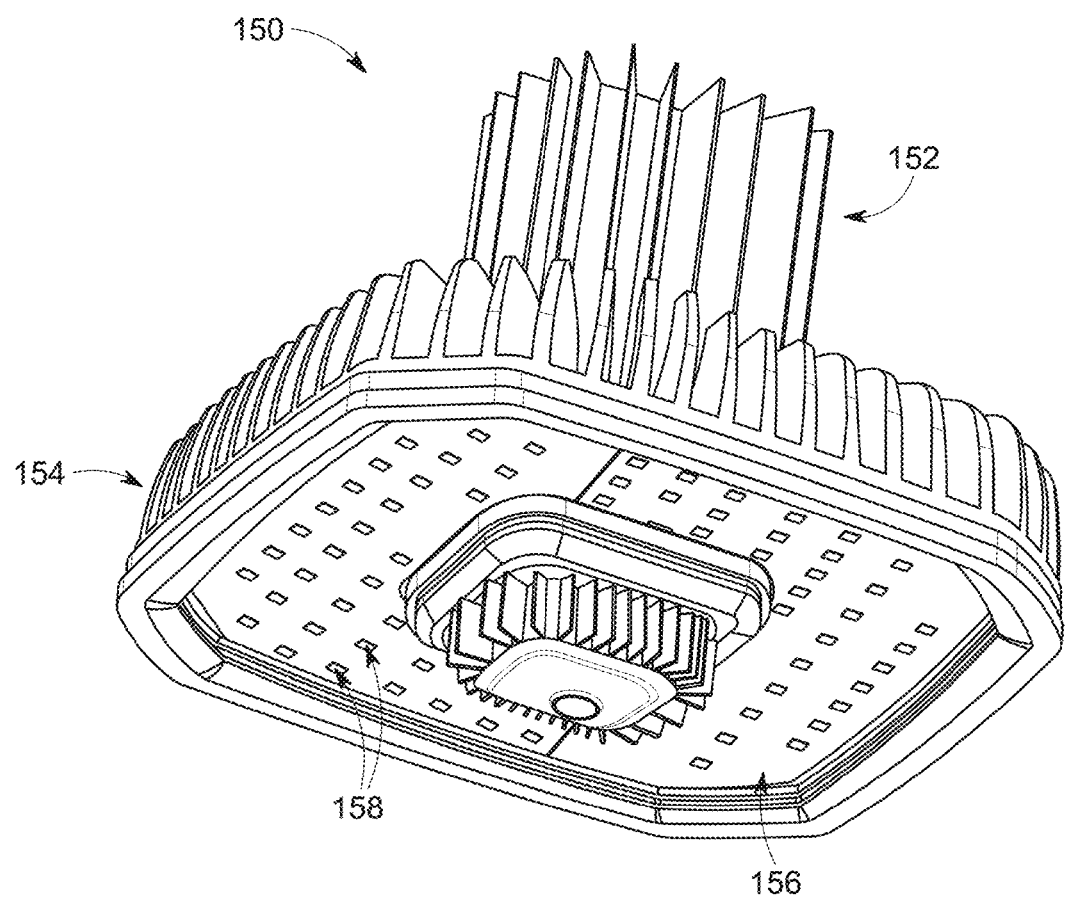
FIG. 9A is a perspective view of a luminaire incorporating a sensor housing and module according to some embodiments.
Figure 9B:
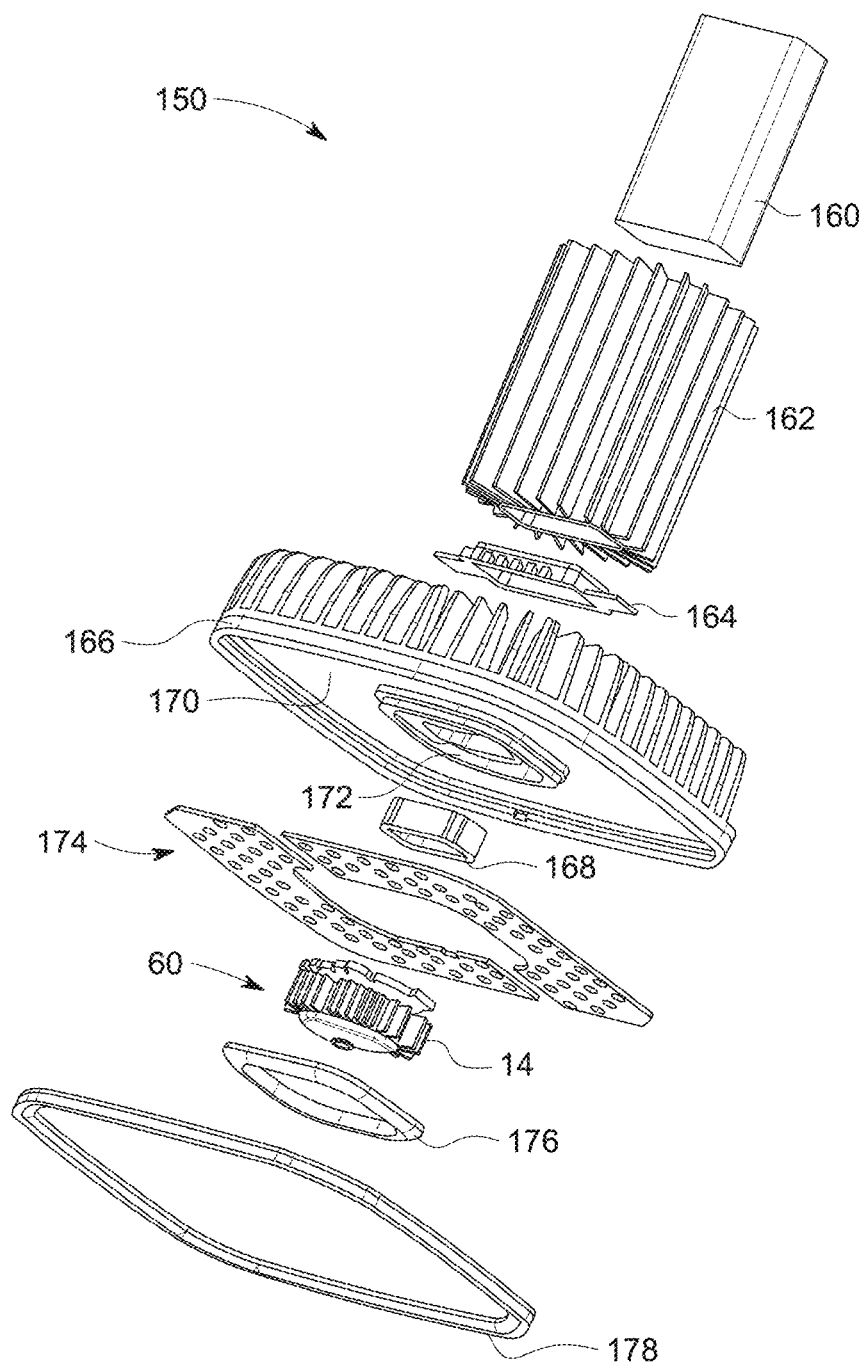
FIG. 9B is an exploded view of the luminaire in FIG. 9A.
Figure 9C:
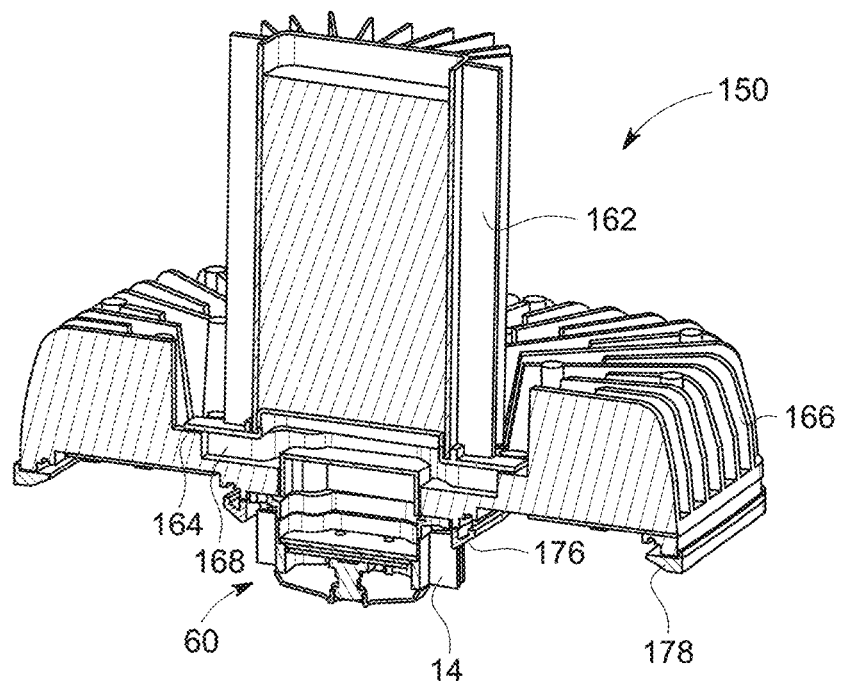
FIG. 9C is a sectional view of the luminaire in FIG. 9A.

FIGS. 9A-9C are perspective, exploded, and sectional views, respectively, of a luminaire generally designated 150. The luminaire 150 comprises a driver assembly 152, a light emitting assembly 154, and an image sensing assembly (i.e., the image sensing module 60). The luminaire 150 further comprises a light emitting face 156 from which a plurality of LEDs 158 emit light. In some cases, the LEDs 158 are arranged in an array, where adjacent LEDs 158 are spaced apart from each other at uniform or non-uniform distances. The LEDs 158 can be used in conjunction with one or more lenses or optics (not shown) to output light having a desired lighting distribution, pattern, or output characteristics.

As FIG. 9B illustrates, the driver assembly 152 comprises a driver 160 that is thermally coupled to a driver heat sink 162 (a first heat sink). The driver 160 can comprise a plurality of electrical components and circuitry (e.g., capacitors, resistors, integrated circuits, etc.) that power the luminaire 150 causing the LEDs 158 to emit light. The driver 160 can comprise a circuit assembly optimized for lower power and wide input voltage. The driver assembly 160 generates heat, which is dissipated via the driver heat sink 162. The driver heat sink 162 comprises a plurality of heat dissipating structures or fins, which are optionally rotationally symmetric relative to a central axis of the luminaire 150. Non-rotationally symmetric fins are also contemplated. The driver heat sink 162 is thermally insulated and/or isolated from the remaining portions of the luminaire 150 via an insulating member 164. The driver assembly 160 can be vertically positioned in a central region of the luminaire 150.

The driver heat sink 162 can be formed of any suitable material not inconsistent with the objectives of the present invention. Generally, the driver heat sink 162 can be formed of a material having a thermal conductivity in the range of 3-300 W/m·K. In some embodiments, the driver heat sink 162 is fabricated from aluminum or other metal or alloy. For example, the driver heat sink 162 can be fabricated from aluminum or other metal via extruding, machining, casting, pressing, forging, or milling. Alternatively, the driver heat sink 162 can be formed of a polymeric material or composite and produced via die-casting or molding techniques. The driver heat sink 162 can comprise single fins, branched fins, tapered fins, and/or curved fins.

In some embodiments, a potting material is applied to portions of the driver assembly 160, driver heat sink 162, and/or an insulating member 164 disposed between the driver assembly 152 and remainder of luminaire 150. Potting material, in some embodiments, can enhance the ingress protection rating of the driver by providing a waterproof barrier protecting the driver and other electrical components. Potting material can additionally assist in thermal management of the driver by transferring heat generated by the driver 160 to the heat sink 162. Potting material can comprise a thermoset or thermoplastic material and is generally selected from the group consisting of epoxy resin, polyurethane resin, silicon resin and polyester systems.

Any of the embodiments disclosed herein may include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein, such as disclosed in U.S. patent application Ser. No. 14/292,286, filed May 30, 2014, entitled "Lighting Fixture Providing Variable CCT" by Pope et al. incorporated by reference herein. Additionally, any of the embodiments described herein can include driver circuitry disclosed in U.S. Pat. No. 9,730,289, titled Solid State Light Fixtures Having Ultra-Low Dimming Capabilities and Related Driver Circuits and Methods, filed on Feb. 8, 2016 and assigned to the same assignee as the present application, the entirety of this application being incorporated herein by reference.

Still referring to FIG. 9B and in some embodiments, the light emitting assembly 154 comprises a light emitter heat sink 166 (a second heat sink) that is thermally insulated and isolated from the remaining portions of the luminaire 150 via a second insulating member 168. The light emitter heat sink 166 comprises a base 170 and a central aperture 172 disposed therein for passing convective air currents to the driver heat sink 162. A portion of the driver heat sink 162 is received in the aperture 172 of the light emitter (LED) heat sink 166.

The light emitter heat sink 166 can be formed of a material having a thermal conductivity in the range of 3-300 W/m·K. For example, the heat sink 166 can comprise aluminum or a high conductively plastic having as thermal conductivity of about 8 W/m·K, or between 5-300 m·K, 5-200 m·K, 5-100 m·K, 5-50 m·K, or <300 m·K. In some embodiments, the light emitter heat sink 166 is fabricated from aluminum or other metal or alloy. For example, the light emitter heat sink 166 can be fabricated from aluminum or other metal via extruding, machining, pressing, or milling. Alternatively, the light emitter heat sink 166 can be formed of a polymeric material or polymeric composite and produced by die-casting or molding techniques. The light emitter heat sink 166 can comprise single fins, branched fins, tapered fins, and/or curved fins. In some embodiments, the light emitter heat sink 166 has fins on a face opposing the light emitting face 156 (FIG. 9A), although fins may be provided on any surface thereof not inconsistent with the objects of the instant subject matter.

The luminaire 150 can comprise one or more LED panels 174 having arrays of LEDs 158 disposed thereon. The panels 174 can be coupled to the base 170 of the heat sink 166. In the embodiment illustrated in FIGS. 9A-9C, two LED panels 174 are arranged around the central aperture 170 of the heat sink base 166. A single LED panel 174 or more than two panels 174 are also contemplated.

The LED panels 174 can be fabricated to match any desired size and/or shape of the heat sink base 170. For example, in some embodiments, the heat sink base and panels can be annular, circular, or elliptical, wherein the LED panels 174 are provided in arcuate shapes for coupling to the base. In other embodiments, the LED panels 174 are substantially squared. Pins can be used to secure the LED panels 174 in place for rough alignment followed by electrical connection of the panels 174 to the driver 160. Thermal paste or glue can be used to improve the adhesion and/or thermal coupling of the panels to the heat sink 166.

In some embodiments, the LEDs 158 of the LED panels 174 comprise packaged LED chip(s) or unpackaged LED chip(s). The LEDs 158 of the panels 174 can use LEDs of the same or different types and/or configurations. The LEDs 158 can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc.

The LED module 150 can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs 158 can be mounted directly to the heat sink 166 or another type of board or substrate. Depending on the embodiment, the lighting device can employ LED arrangements or lighting arrangements using remote phosphor technology as would be understood by one of ordinary skill in the art, and examples of remote phosphor technology are described in U.S. Pat. No. 7,614,759, assigned to the assignee of the present invention and hereby incorporated by reference.

In those cases where a soft white illumination with improved color rendering is to be produced, one or more of blue shifted yellow LEDs and one or more red or red/orange LEDs may be provided as described in U.S. Pat. No. 7,213,940, assigned to the assignee of the present invention and hereby incorporated by reference. The LEDs 158 may be disposed in different configurations and/or layouts as desired, for example utilizing single or multiple strings of LEDs where each string of LEDs comprise LED chips in series and/or parallel.

Different color temperatures and appearances could be produced using other LED combinations of single and/or multiple LED chips packaged into discrete packages and/or directly mounted to a printed circuit board as a chip-on board arrangement. In one embodiment, the light source comprises any LED, for example, an XQ LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, other LED arrangements are possible. In some embodiments, a string, a group of LEDs or individual LEDs can comprise different lighting characteristics and by independently controlling a string, a group of LEDs or individual LEDs, characteristics of the overall light out output of the device can be controlled.

Still referring to FIG. 9B, the sensor module 60 can be disposed between portions of the LED panels 174 and mounted on or over the light emitter heat sink 166. In certain embodiments, the sensor module 60 is centrally disposed between the LED panels 174 although non-centrally disposed modules 60 are contemplated. The sensor module 60 can be integrated at any position in the luminaire 150 not inconsistent with the objectives of the present subject matter. For example, the sensor module 60 can be integrated into the luminaire at a position at least partially overlapping the light emitting face 156, in an aperture of the light emitting portion 154, or adjacent to the driver portion 152. The sensor module 60 may be mounted directly or indirectly to the light emitter heat sink 166. Notably, the sensor module 60 is thermally insulated from each of the driver and light emitter heat sinks 162 and 166, respectively, via thermally insulating portions of the module 60 or a separate and discretely positioned isolator. In some embodiments, thermally insulating material is disposed between the sensor and heat sinks of the driver and LEDs. For example, potting material or thermally insulating material may separate the sensor and associated electronics from the driver and LED heat sinks 162, 166. The thermally insulating material may be contained in the module 60. In other embodiments, the thermally insulating material be positioned between the module 60 and luminaire components. The sensor module 60 can be integrated at any position in the luminaire not inconsistent with the objectives of the present invention. The sensor module 60 and the LED panels 174 can be sealed within the luminaire 150 via gaskets 176 and 178.

FIG. 9C is a sectional view of the luminaire 150. Each of the multiple, discrete heat sinks, the (first) driver heat sink 162, the (second) light emitter heat sink 166, and the sensor module heat sink 14 are disposed in a vertically stacked configuration. The light emitter heat sink 166 partially or fully surrounds the driver heat sink 162. The heat sinks (i.e., 162, 166, and 14) are spaced apart from each other and thermally insulated from each other for improving the thermal management in luminaire 150.

Figure 10:
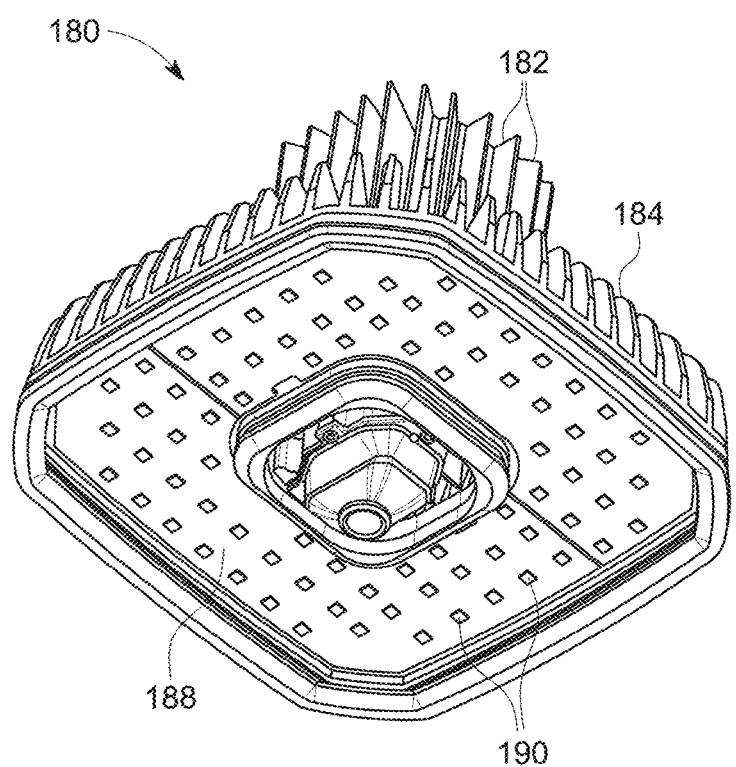
FIG. 10 is a perspective view of a luminaire incorporating a sensor housing and module according to some embodiments.
Figure 11:
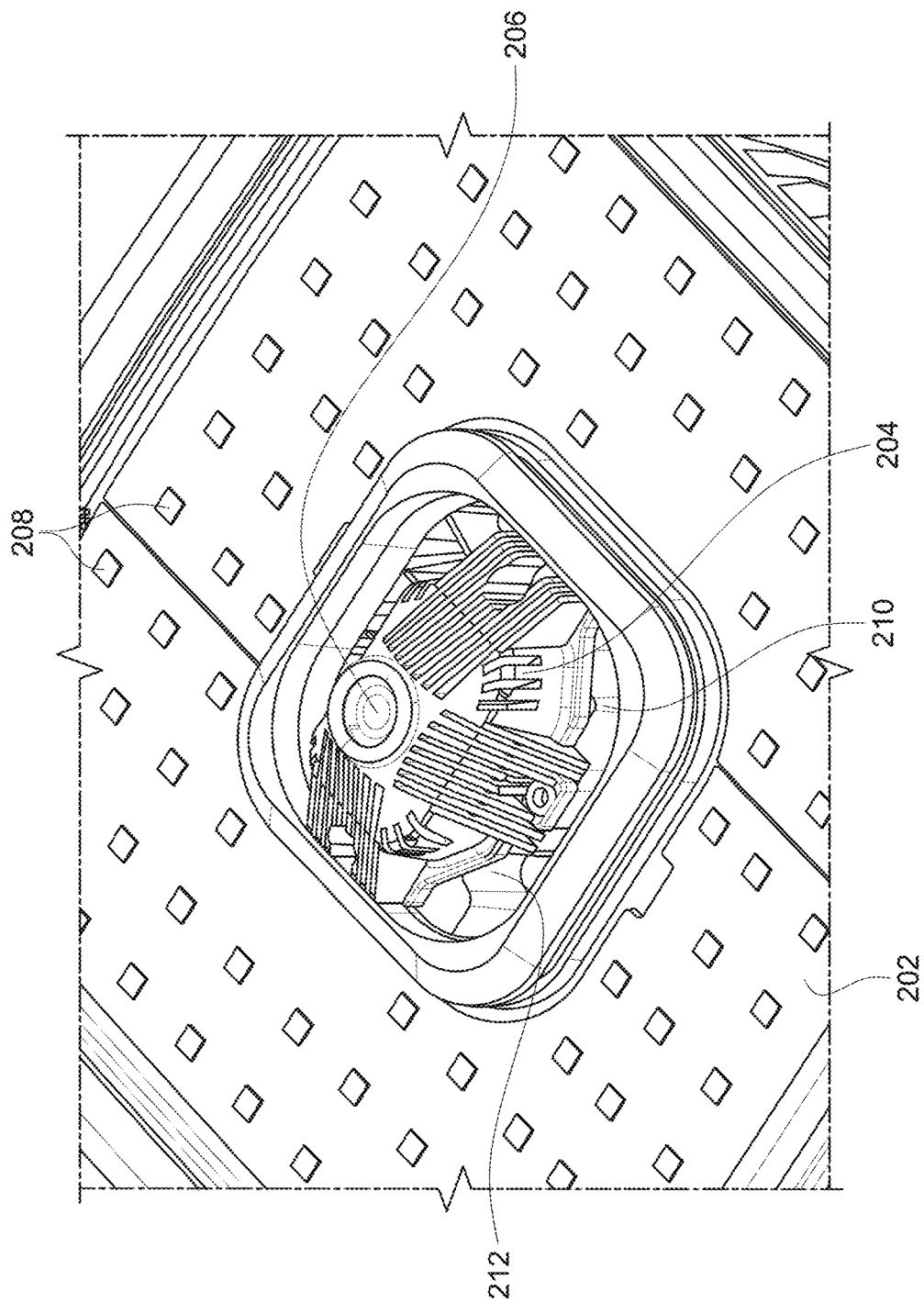
FIG. 11 is a perspective view of a light emitting face of a luminaire incorporating a sensor housing and module according to some embodiments.

FIGS. 10 and 11 are further embodiments of luminaires, generally designated 180 and 200, respectively. Each luminaire comprises an image sensor (62, FIG. 3A) disposed in a sensor housing 10. As FIG. 10 illustrates, the luminaire 180 comprises a driver assembly thermally coupled to a first heat sink 182, an LED assembly thermally coupled to a second heat sink 184 and an image sensor (62, FIG. 3A) thermally coupled to a module heat sink 188. The first, second, and module heat sinks 182, 184, and 188 are thermally insulated from each other. The first, second, and module heat sinks 182, 184, and 188 can be, but do not have to be, disposed in a vertically stacked configuration without physical contact. The spaces or gaps between the multiple heat sinks facilitate convective cooling of driver components, LEDs 190, and the image sensor. In certain embodiments, the image sensor in luminaire 180 can detect motion, whereby the LEDs 190 are energized and emit light when a building or room is occupied and de-energized, to emit little or no light when a building or room is unoccupied for increased energy savings.

FIG. 11 is a view of a light emitting face 202 of the luminaire 200. An image sensing module comprising a sensor housing 204 and an image sensor 206 disposed in the housing. A plurality of LEDs 208 can surround portions of the housing 204. The sensor housing 204 can comprise a plurality of fins for dissipating heat from the image sensor 206 thus improving thermal management in the luminaire 204. The housing 204 can be mounted or attached to the luminaire 200 via one or more pins, bolts, screws, or other fastening member 208. A gasket 210, optionally comprised of potting material, is disposed around portions of the housing 204 to thermally isolate and/or insulate the sensor module from other portions of the luminaire. The sensor housing 204 can be attached to portions of the LED heat sink, but be thermally insulated therefrom via gasket 210 and/or a thermally insulating portion 212 of the housing.

Figure 12A:
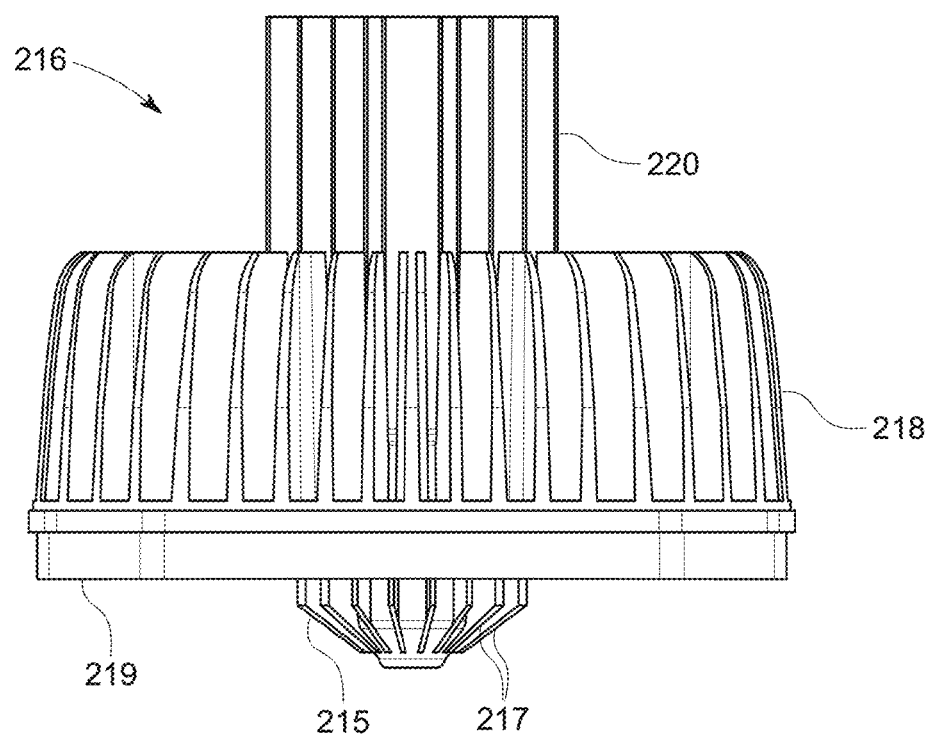
FIGS. 12A-12D are perspective views of various luminaires incorporating sensor housings and modules according to some embodiments.
Figure 12B:
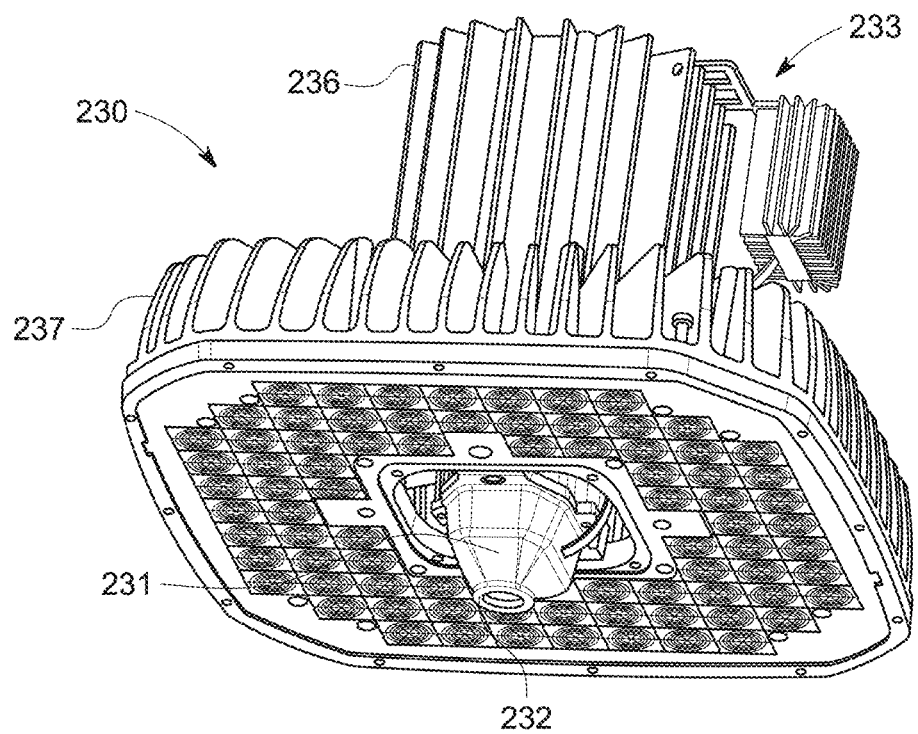

FIGS. 12A-12D illustrate various positions and/or locations of the sensor modules and/or portions thereof. According to FIG. 12A, the sensor module 215 can be disposed proximate a lower portion of a luminaire 216. The sensor module 215 can at least partially overlap and/or extend from the light emitting face 219 of the luminaire 216. As FIG. 12A illustrates, the sensor module 215 comprises, includes, consists, and/or consists essentially of an image sensor and a heat sink comprised of a plurality of fins 217 that are vertically stacked in relation to a LED heat sink 218 and a driver heat sink 220.

Figure 12C:
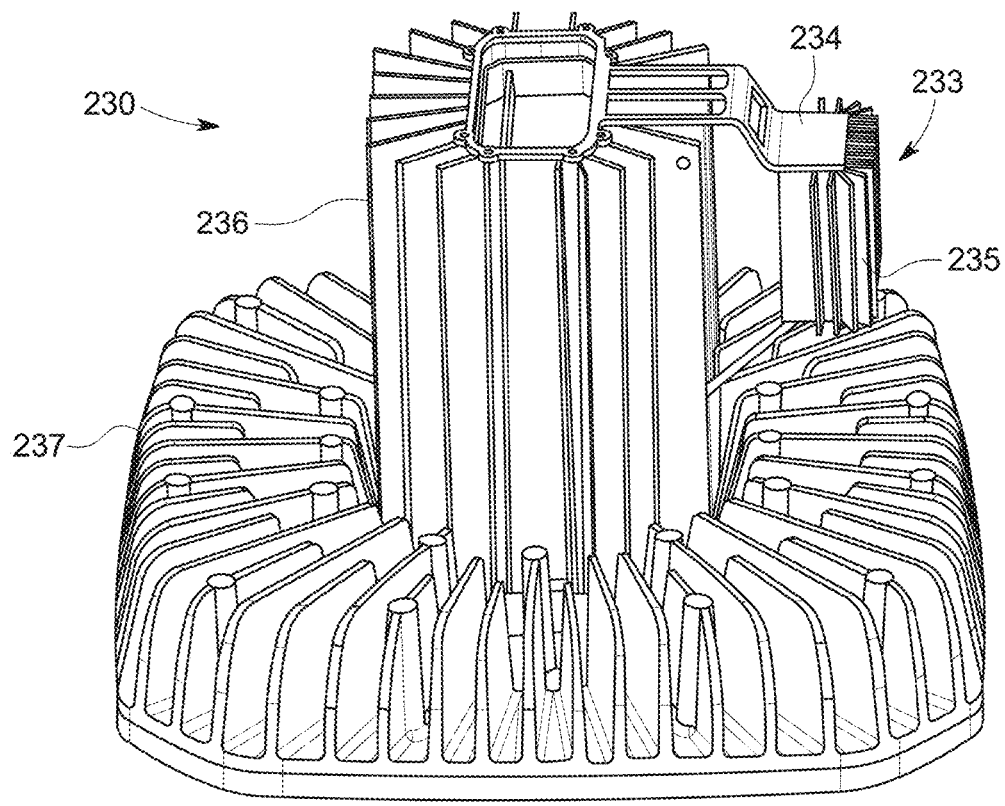
Figure 12D:
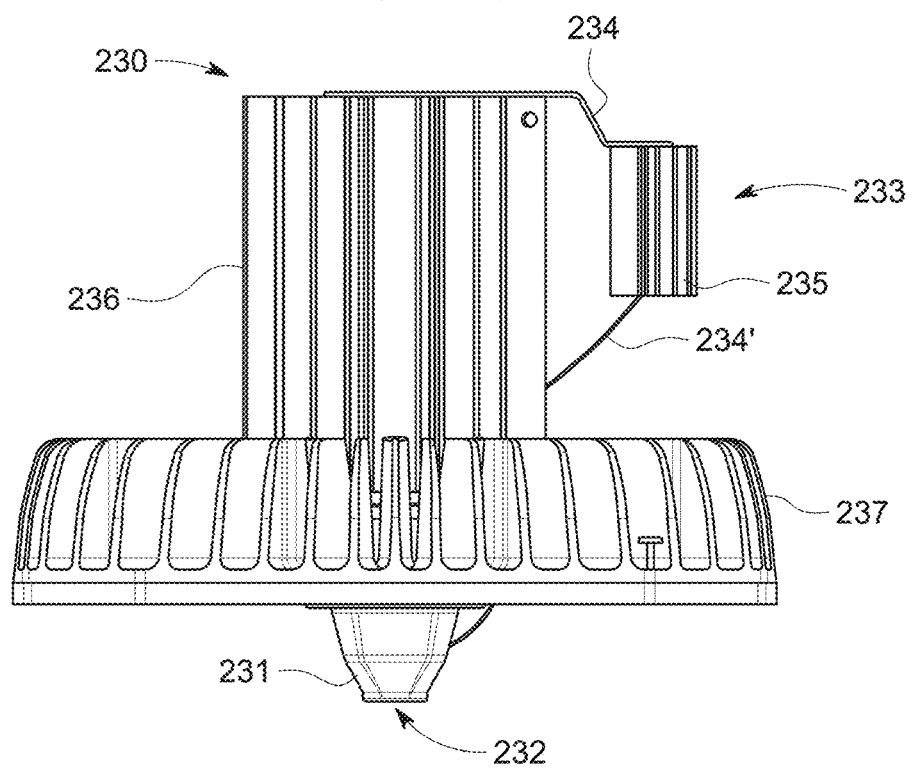

FIGS. 12C-12D illustrate a luminaire 230 comprised of a non-integrated sensor module. In this embodiment, a sensor housing 231 and a sensor 232 housed therein are separate and remote from the image sensor electrical components and sensor heat sinking structure 233.

The luminaire 230 comprises a first heat sinking structure 237 configured to sink heat from one or more LEDs, a second heat sinking structure 236 configured to sink heat from a driver assembly, and a sensor module heat sinking structure. The module heat sinking structure is the sensor heat sinking structure 233, which is configured to sink heat from the sensor electronics. In this embodiment, the sensor module heat sinking structure 233 is adjacent to second (driver) heat sinking structure 236.

As FIGS. 12C and 12D illustrate, the sensor heat sinking structure 233 is attached to portions of the driver heat sink (236) via one or more supports 234, such as brackets, bars, struts, shafts, or beams. The driver heat sink 233 comprises a plurality of heat dissipating structures 235, such as fins, blades, or tabs. As FIGS. 12C-12D illustrate, the sensor electronics are remotely located, while the image sensor is disposed at the central and lower part of the luminaire. Sensor and sensor electronics may communicate via one or more cables or wires 234'. In other embodiments, sensor and sensor electronics communicate wirelessly.

Figure 13:
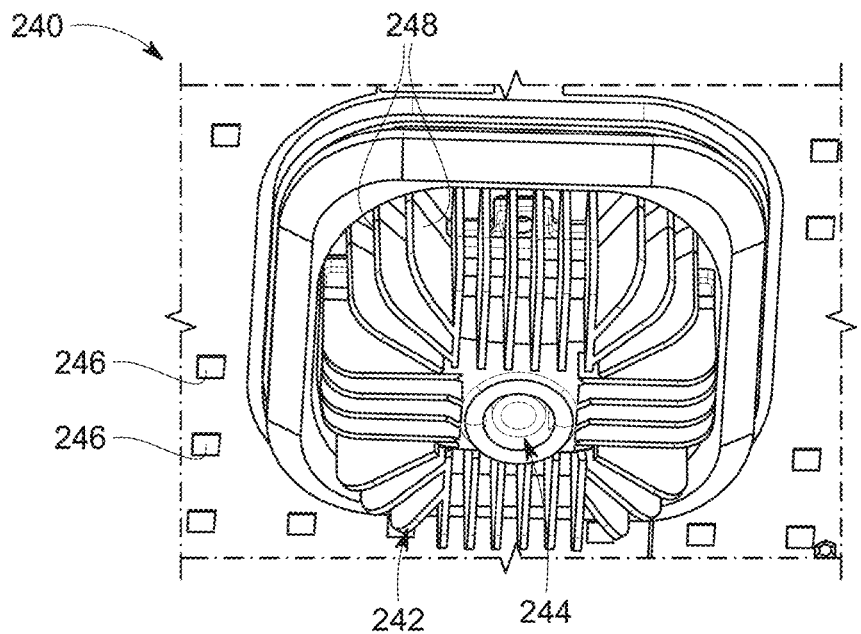
FIG. 13 is a perspective view of a luminaire incorporating a sensor housing and module according to some embodiments.

FIG. 13 illustrates a further embodiment of a luminaire 240 comprising a sensor module comprised of a sensor housing 242 and an image sensor 244 disposed in the sensor housing. The lens of the image sensor is visible through an aperture of the sensor housing 242. The sensor housing 242 forms a heat sink or a heat sinking enclosure for housing the image sensor 242. The heat sinking enclosure comprises a plurality of fins 248. The fins can be disposed around the perimeter of the housing 242, including the sides, upper face, and/or corners of the housing 242. The fins 248 dissipate heat generated by the image sensor 244 into the surrounding environment. A separate heat sink dissipates heat generated by a plurality of LEDs 246 disposed around the housing 242.

Figure 14:
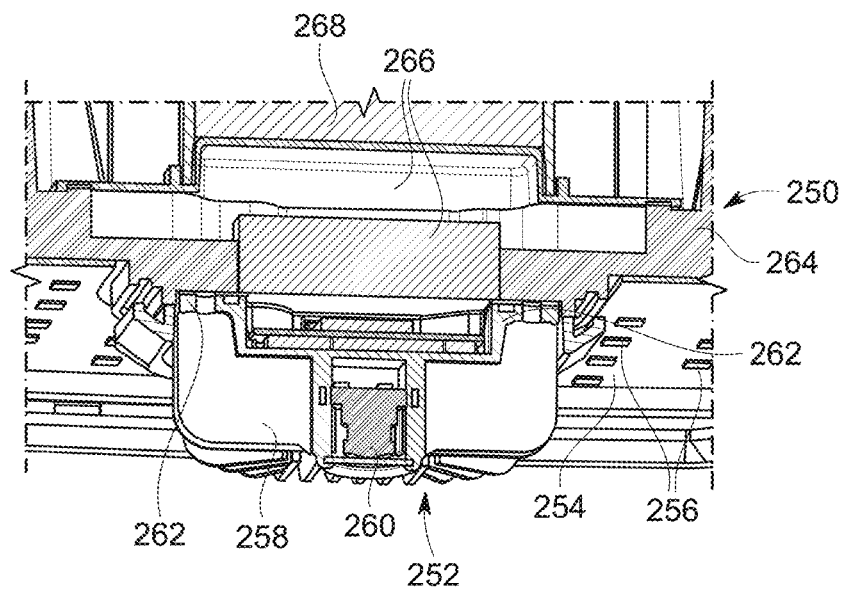
FIG. 14 is a sectional view of a luminaire incorporating a sensor housing and module according to some embodiments.

FIG. 14 illustrates a further sectional view of an exemplary luminaire, generally designated 250. Luminaire 250 comprises an image sensing module 252 extending from and/or disposed on or over a light emitting face 254 of the luminaire. LEDs 256 are disposed over the light emitting face 254 and around the sensing module 252. The sensing module 252 comprises a housing 258 that forms a heat sinking enclosure for an image sensor 260. The housing 258 is configured to dissipate heat generated by the image sensor 260. The housing further comprises an insulating portion or region 262 that faces an LED heat sink 264. A heat shield 266 is positioned or disposed between the sensor module 252 and the LED heat sink 264. The heat shield 266 is also positioned or disposed between the LED heat sink 264 and an LED driver 268. The heat shield 266 can comprise any thermally insulating material, such as a polymeric material, plastic, a potting material, or ceramic.

The sensor housings and modules described herein can be integrated at any position in the luminaire not inconsistent with the objectives of the present invention. The sensor housings and modules are at least partially comprised of an insulator, although separate insulators an also be used. The sensor module, for example, can be integrated into the luminaire at a position at least partially overlapping the light emitting face. In some embodiments, the sensor module is positioned in an aperture of a light emitting diode assembly.

In any of the embodiments disclosed herein each of the light emitting portions or can have different or the same light distribution, although each may have a directional emission distribution (e.g., a side emitting distribution), as necessary or desirable. More generally, any lambertian, symmetric, wide angle, preferential-sided or asymmetric beam pattern LED element(s) or module(s) may be used as the light source.

The luminaires having thermal management designs and architectures utilizing multiple discrete and thermally insulated heat sinks (i.e., a first heat sink for the driver, a second heat sink for the LEDs, and a module heat sink for the image sensor) described and illustrated herein can offer various performance advantages and lighting efficiencies. Thermal management efficiencies realized by luminaires described herein can permit operation at high ambient temperatures while extending driver and LED lifetimes. In some embodiments, the luminaires described herein can have an ambient temperature rating of 60-70° C. or 65-75° C. In addition to enhanced thermal management, the luminaires described herein can provide desirable lighting characteristics including an output of 15,000 to 70,000 lumens at efficiencies of at least 125 lumens per watt (LPW), such as 150-180 LPW. Table 5 provides additional lighting properties of luminaires having designs and constructions described herein.

TABLE 5

Luminaire Lighting Properties

| Output (lm) | LPW | Correlated Color Temp. (CCT) | Color Rendering Index (CRI) |
|---|---|---|---|
| 18,000 | 140 | 4000K, 5000K | 80 |
| 24,000 | 140 | 3500K, 4000K, 5000K | 80 |
| 35,000 | 140 | 3500K, 4000K | 80 |
| 70,000 | 140 | 3500K, 4000K | 70 |

In addition to desirable lighting characteristics, the luminaires described herein provide several additional advantages. For example, a single luminaire comprised of multiple separate and discrete heat sinks improves thermal management in the luminaire, allowing the LEDs and image sensor to remain cooler, having improved operability and efficiency.

Figure 18:
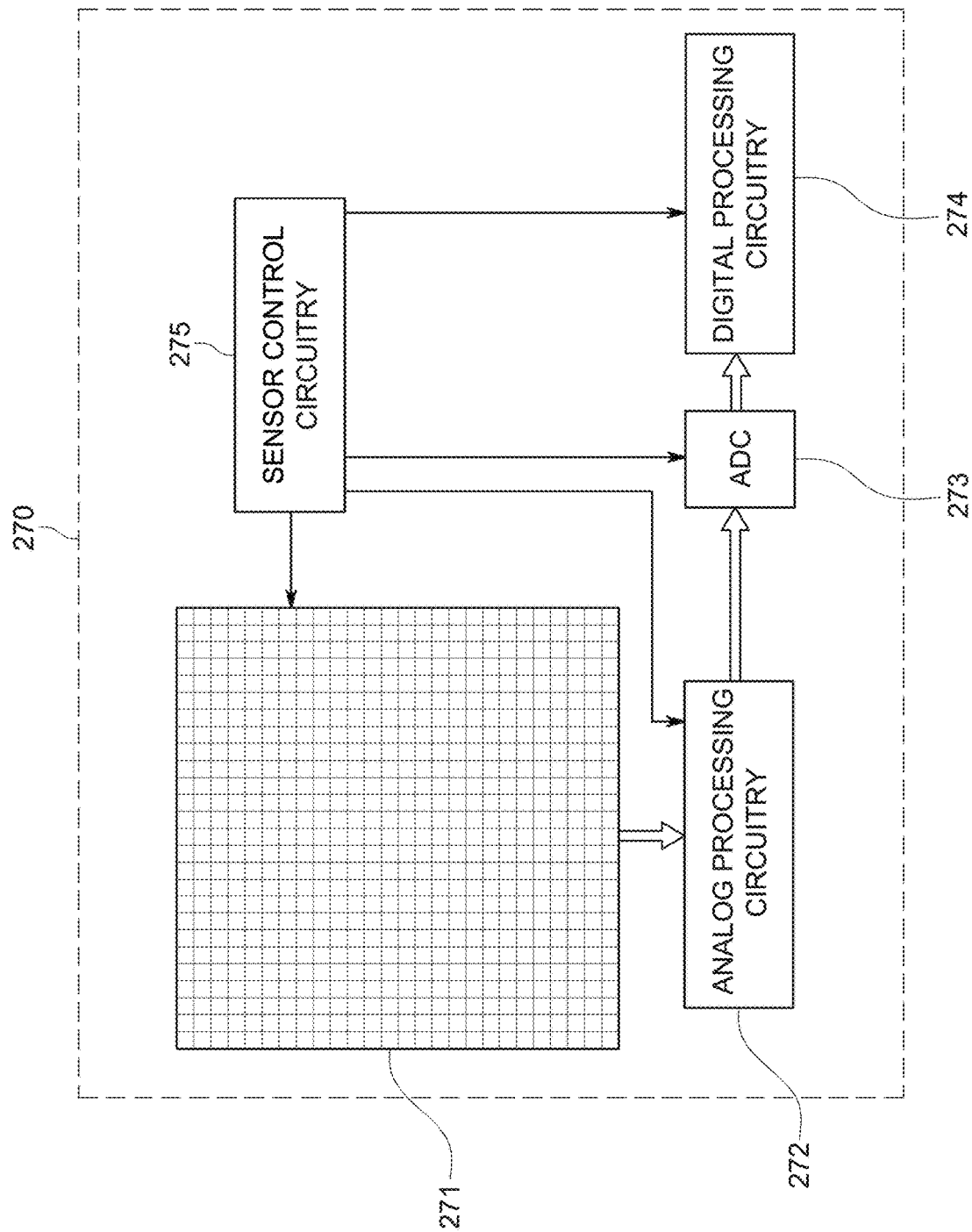
FIG. 18 is a schematic block diagram of an image sensor for integration in a housing, module, and/or luminaire according to some embodiments.

Details of a CMOS-based image sensor and associated processing are illustrated in the non-limiting embodiment of FIG. 18. While a CMOS-based image sensor 270 is illustrated, those skilled in the art will appreciate that other types of image sensors, such as CCD-based sensors, may be employed. The image sensor 270 generally includes a pixel array 271, analog processing circuitry 272, an analog-to-digital converter (ADC) 273, digital processing circuitry 274 and sensor control circuitry 275. In operation, the pixel array 271 will transform light that is detected at each pixel into an analog signal and pass the analog signal for each pixel of the array 271 to the analogy processing circuitry 272. The analog processing circuitry 272 will filter and amplify the analog signals to create amplified signals, which are converted to digital signals by the ADC 273. The digital signals are processed by the digital processing circuitry 274 to create image data corresponding to the captured image.

The sensor control circuitry 275 will cause the pixel array 271 to capture an image in response to an instruction, for example, from a control system. The sensor control circuitry 275 controls the timing of the image processing provided by the analog processing circuitry 272, the ADC 273 and the digital processing circuitry 274. The sensor control circuitry 275 also sets the image sensor's processing parameters, such as the gain and nature of filtering provided by the analog processing circuitry 272 as well as the type of image processing provided by the digital processing circuitry 274.

Figure 19:
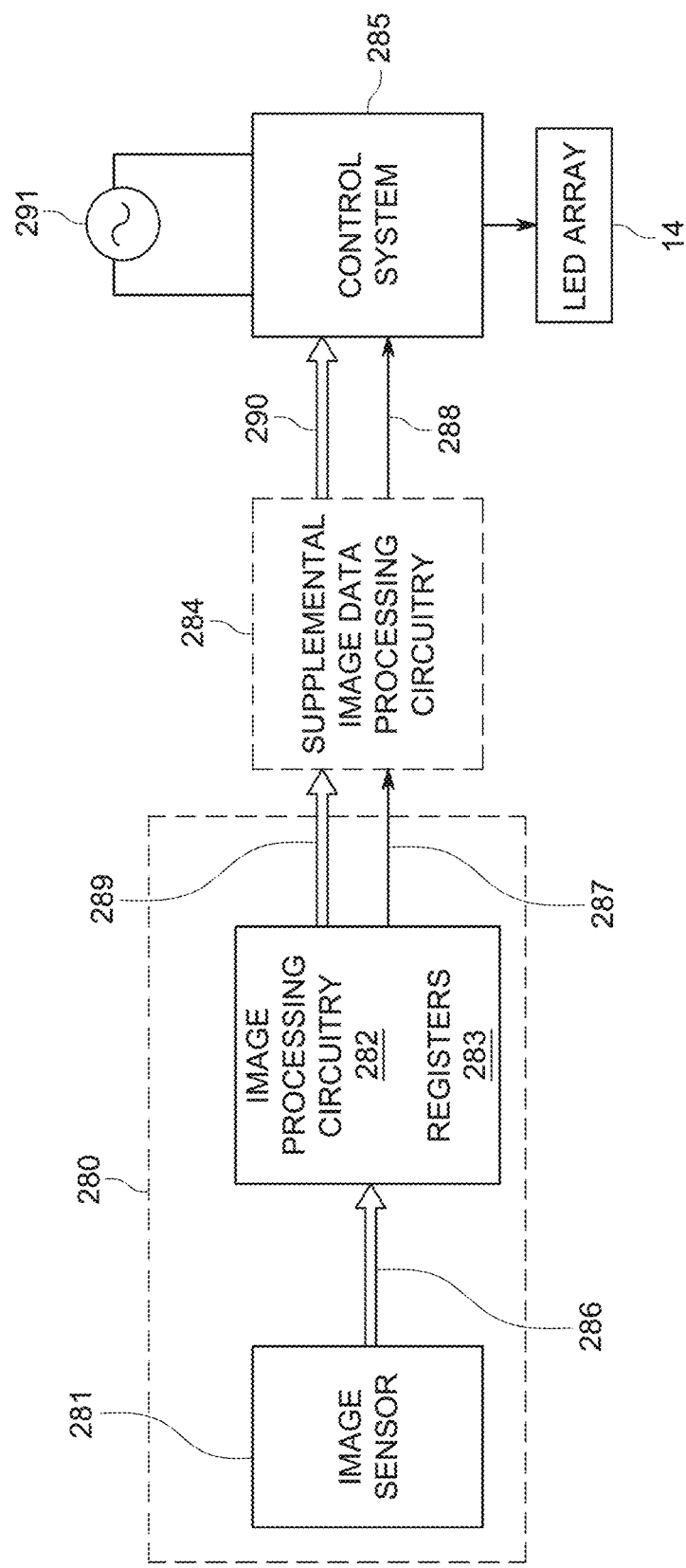
FIG. 19 is a schematic block diagram of a luminaire employing a sensor module that houses an image sensor according to some embodiments.

FIG. 19 illustrates an electrical block diagram of a luminaire employing a sensor module 280 comprising an image sensor 281 according to some embodiments. The sensor module 280 also comprises image processing circuitry 282, which in turn includes a number of registers 283, optional supplemental image data processing circuitry 284, a control system 285 and the LED array 14. The sensor module 280 may be a system on chip (SoC) in which the image sensor 281 and processing circuitry 282 are integrated onto a single chip. The supplemental image processing circuitry 284 may be provided either together or separately from the sensor module 280. The supplemental image data processing circuitry 284 may be used to offload computations related to image data and/or derived image data that cannot be processed by the image processing circuitry 282.

In operation, the image sensor 281 is configured to capture images as described above. The data from these images is sent to the image processing circuitry 282. In the embodiment of FIG. 19, the image data is sent via a high speed bus 286. The image processing circuitry 282 may perform a number of operations on the imaged data, including filtering and adjusting the image data. In some embodiments, the image processing circuitry may address signals generated by light reflected from one or more optics of the luminaire and/or signal generated by other environmental artifacts. For example, the image processing circuitry can remove or exclude signal generated by light reflected from a glare shield employed in the luminaire architecture. The image processing may also remove any image distortion introduced by the asymmetrical lens.

Further, the image processing circuitry 282 may determine derived image data from the image data. In general, the derived image data is a downsampled form of the image data. The derived image data may be provided in the normal course of operation of the sensor module 280. The supplemental image data processing circuitry 284 may perform one or more computations on the derived image data to determine an ambient light level and/or occupancy event. However, these computations may also be performed directly by the control system 285. Using the derived image data may allow the supplemental image data processing circuitry to use a first low-speed bus 287 to communicate with the image processing circuitry 282.

Similarly, it may also enable the control system to communicate with a second low speed bus 288 with the supplemental image data processing circuitry 284 and/or directly with the image processing circuitry 282. This is due to the fact that the derived image data is downsampled when compared to the actual image data and, therefore, can be transferred quickly when compared to the actual image data. In situations wherein the derived image data is insufficient to accurately characterize the area surrounding the luminaire, the full image data may be transferred from the image processing circuitry 282 to the supplemental image data processing circuitry 284 via a second high speed bus 289 for further review. The image data may then be processed by the supplemental image data processing circuitry 284 and the necessary data sent via the second low speed bus 288 to the control system 285, or the full image data may also be sent to the control system 285, either directly from the image processing circuitry 282 via a third high speed bus 290 or indirectly from the supplemental image data processing circuitry 284 via the third high-speed bus 290.

The first high-speed bus 286, the second high-speed bus 289 and the third high-speed bus 290 may be a universal serial bus (USB), a peripheral component interconnect (PCI), an external serial advanced attachment (eSATA) bus of the like. The first low-speed bus 287 and second low-speed bus 288 may be any number of low-speed buses known in the art. For example, the first low-speed bus 287 and second low-speed bus 288 may be an RS-232 bus, a serial peripheral interface (SPI), a I²C bus or the like.

Still Referring to FIG. 19 and in some embodiments, control system 285 is configured to use the image data and/or the derived image data to adjust one or more light output characteristics of the LED array 292 disposed on or in the luminaire. For example, the control system 285 can use the image data and/or derived image data to adjust color temperature, light intensity, color, vividness or the like of the light output by the LED array 292. An alternating current (AC) power source 291 may provide power for the control system 285 and LED array 292. Additional features of a sensor module comprising an image sensor and associated image processing are further described in U.S. patent application Ser. No. 14/928,592 Nov. 5, 2015, entitled "Lighting Fixture with Image Sensor Module", which is incorporated herein by reference in its entirety.

As noted above and some embodiments, sensor modules described herein can also comprise radio frequency (RF) communication apparatus. The luminaire, for example, can be part of a wireless distributed lighting network. For example, luminaires of the network may communicate with one another via Institute of Electrical and Electronic Engineers standard 802.15 or some variant thereof. Using a wireless mesh network to communicate between luminaires may increase the reliability thereof and allow the wireless lighting network to span large areas.

Examples of luminaires and wireless network architectures employing RF communication are provided in U.S. Patent Application Ser. No. 62/292,528, titled Distributed Lighting Network referenced above. When RF communication apparatus is included in the sensor module, RF-transmissive materials are can be employed in the construction of sensor housings modules so as not to interfere with RF transmission or reception. Luminaire optics can also be constructed of RF-transmissive material RF-transmissive materials can comprise plastic or polymeric materials. In some embodiments, RF-transmissive windows are provided in the sensor housings and/or modules described herein. In additional embodiments, the sensor housings and modules are constructed of metal, wherein the metal is employed as an antenna for propagation of RF signal to and/or from the RF-communication module.

In various embodiments set forth herein, various features are described in the following applications: Ser. No. 15/181,065 entitled "LED Luminaire Having Enhanced Thermal Management", filed on Jun. 13, 2016 and Ser. No. 15/449,126 entitled "Image Sensor Modules and Luminaires Incorporating the Same" filed on Mar. 3, 2017, each of which is hereby incorporated by reference herein in its entirety.

In various embodiments described herein various smart technologies may be incorporated in the lamps as described in the following applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Multi-Agent Intelligent Lighting System," application Ser. No. 13/782,040, filed Mar. 1, 2013, which is incorporated by reference herein in its entirety; "Routing Table Improvements for Wireless Lighting Networks," application Ser. No. 13/782,053, filed Mar. 1, 2013, which is incorporated by reference herein in its entirety; "Commissioning Device for Multi-Node Sensor and Control Networks," application Ser. No. 13/782,068, filed Mar. 1, 2013, which is incorporated by reference herein in its entirety; "Wireless Network Initialization for Lighting Systems," application Ser. No. 13/782,078, filed Mar. 1, 2013, which is incorporated by reference herein in its entirety; "Commissioning for a Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 10, 2013, which is incorporated by reference herein in its entirety; and "Enhanced Network Lighting," application Ser. No. 61/932,058, filed Jan. 27, 2014, which is incorporated by reference herein in its entirety.

Additionally, any of the luminaire embodiments described herein can include the smart lighting control technologies disclosed in U.S. Patent Application Ser. No. 62/292,528, titled Distributed Lighting Network, assigned to the same assignee as the present application, the entirety of this application being incorporated herein by reference.

Any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry can include at least one of a network component, an RF component, a control component, and one or more sensors. A sensor, such as a knob-shaped sensor, may provide an indication of ambient lighting levels and/or occupancy within the room or illuminated area.

The examples and figures described hereinabove are for illustration purposes only. Numerous modifications and adaptations will be readily apparent to those of skill in the art without departing from the instant subject matter. It will be understood that various details of the subject matter described herein may be changed without departing from the scope of the subject matter described herein. Furthermore, the foregoing description is for the purpose of illustration only, and not for the purpose of limitation.

The invention claimed is:

1. A luminaire comprising:
an electronic sensor having a sensor housing in thermal communication with a heat sink, the heat sink comprising a plurality of heat dissipation structures radially arranged over an outer wall of the sensor housing.

2. The luminaire of claim 1, where the luminaire further comprises a luminaire housing.

3. The luminaire of claim 2, where the luminaire housing includes the sensor housing.

4. The luminaire of claim 1, where the electronic sensor comprises drive circuitry, and
a sensing device in electrical communication with the drive circuitry.

5. The luminaire of claim 4 where the drive circuitry comprises at least any one of a processor, a controller, a memory element, a wireless antenna, and combinations thereof.

6. The luminaire of claim 1 where the heat sink is configured to thermally insulate the electronic sensor.

7. The luminaire of claim 1 where the electronic sensor comprises at least any one of an image sensor, a light sensor, a motion sensor, a temperature sensor, a magnetic field sensor, a gravity sensor, a humidity sensor, a moisture sensor, a vibration sensor, a pressure sensor, an electrical field sensor, a noise sensor, an environmental sensor, a directional sensor, a position sensor, a velocity sensor, an airflow sensor, a chemical sensor, a carbon dioxide sensor, an oxygen sensor, and combinations thereof.

8. The luminaire of claim 1 where the electronic sensor comprises a wireless interface configured to wirelessly communicate data from the electronic sensor.

9. The luminaire of claim 8, wherein the interface comprises one or more antennae within the sensor housing.

10. The luminaire of claim 1 where the sensor housing includes at least one wall defining a cavity for accepting the electronic sensor.

11. The luminaire of claim 10, wherein the heat sink forms a portion of the outer wall.

12. The luminaire of claim 10, wherein the outer wall comprises an aperture.

13. The luminaire of claim 12, wherein the aperture is configured to receive optics of a sensor.

14. The luminaire of claim 1, wherein the heat sink is coupled to a surface of the outer wall.

15. The luminaire of claim 1, wherein the plurality of heat dissipation structures comprises fins.

16. The luminaire of claim 1 further comprising thermally insulating material in the sensor housing.

17. The luminaire of claim 1, wherein the sensor is an image sensor, and the sensor housing is integrated with the luminaire.

18. The luminaire of claim 1, wherein the heat sink forms one or more portions of the sensor housing.

* * * * *